US012000572B2

(12) United States Patent
Harvey et al.

(10) Patent No.: US 12,000,572 B2
(45) **Date of Patent: *Jun. 4, 2024**

(54) STAND LIGHT

(71) Applicant: MILWAUKEE ELECTRIC TOOL CORPORATION, Brookfield, WI (US)

(72) Inventors: Kyle Harvey, West Allis, WI (US); Ross McIntyre, Milwaukee, WI (US); Michael Halverson, Greenfield, WI (US); Eric Mackey, Milwaukee, WI (US); Justin Dorman, Madison, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,002

(22) Filed: Nov. 7, 2022

(65) Prior Publication Data

US 2023/0069015 A1 Mar. 2, 2023

Related U.S. Application Data

(63) Continuation of application No. 17/713,689, filed on Apr. 5, 2022, which is a continuation of application (Continued)

(51) Int. Cl.

*F21V 21/06* (2006.01)
*F21S 9/02* (2006.01)

(Continued)

(52) U.S. Cl.

CPC ............ *F21V 21/06* (2013.01); *F21V 17/007* (2013.01); *F21S 9/02* (2013.01); *F21V 21/088* (2013.01);

(Continued)

(58) Field of Classification Search

CPC .......... F21V 21/06; F21V 21/22; F21V 21/30; F21V 21/0885; F21V 21/26;

(Continued)

(56) References Cited

U.S. PATENT DOCUMENTS 1,176,656 A 3/1916 Curtiss
2,282,285 A * 5/1942 Olson .................. F16M 11/046 16/24

(Continued)

FOREIGN PATENT DOCUMENTS

EP 193756 A2 9/1986
EP 1205428 A2 5/2002

(Continued)

*Primary Examiner* — Peggy A Neils
*Assistant Examiner* — James M Endo
(74) *Attorney, Agent, or Firm* — Michael Best & Friedrich LLP

(57) ABSTRACT

A portable light includes an elongate body having a first end, a second end opposite the first end, a longitudinal axis extending through the first and second ends, and a locking recess between the first end and the second end. The portable light further includes a movable handle that is movable between a first position and a second position along the longitudinal axis of the elongate body, the movable handle defining a grip axis that is parallel to and offset from the longitudinal axis of the elongate body. The portable light further includes an actuator positioned on the movable handle, the actuator operatively coupled to a locking pin that selectively engages the locking recess.

5 Claims, 16 Drawing Sheets

Related U.S. Application Data

No. 17/545,381, filed on Dec. 8, 2021, now Pat. No. 11,306,904, which is a continuation of application No. 17/465,965, filed on Sep. 3, 2021, now Pat. No. 11,530,799, which is a continuation of application No. 15/686,990, filed on Aug. 25, 2017, now Pat. No. 11,112,096, which is a continuation of application No. 14/877,675, filed on Oct. 7, 2015, now Pat. No. 10,378,739.

(60) Provisional application No. 62/152,089, filed on Apr. 24, 2015.

(51) Int. Cl.

| | |
|---|---|
| ***F21V 17/00*** | (2006.01) |
| ***F21V 21/088*** | (2006.01) |
| ***F21V 21/14*** | (2006.01) |
| ***F21V 21/22*** | (2006.01) |
| ***F21V 21/26*** | (2006.01) |
| ***F21V 21/30*** | (2006.01) |
| ***F21V 21/40*** | (2006.01) |
| ***F21V 23/04*** | (2006.01) |
| ***F21W 131/10*** | (2006.01) |

(52) U.S. Cl.

CPC ......... *F21V 21/0885* (2013.01); *F21V 21/145* (2013.01); *F21V 21/22* (2013.01); *F21V 21/26* (2013.01); *F21V 21/30* (2013.01); *F21V 21/40* (2013.01); *F21V 23/04* (2013.01); *F21W 2131/1005* (2013.01)

(58) Field of Classification Search

CPC .... F21V 21/088; F21V 21/084; F21V 21/145; F21V 21/40; F21V 15/012; F21V 15/02; F21V 15/01; F21V 29/507; F21V 29/506; F21V 29/83; F21V 19/004; F21V 23/023; F21V 17/007; F16B 2/10; F16B 7/1418; F16B 7/1454; F16B 7/10; F16B 7/149; F21S 9/02; F21W 2131/1005

See application file for complete search history.

(56) References Cited

U.S. PATENT DOCUMENTS

| | | | | |
|---|---|---|---|---|
| 2,409,075 A | | 10/1946 | Starck | |
| 3,182,714 A | * | 5/1965 | Petrick .................. | G03B 21/58 160/24 |
| 3,282,545 A | | 11/1966 | Bieschke | |
| 3,331,958 A | | 7/1967 | Adler | |
| 3,696,856 A | * | 10/1972 | Potter .................. | G03B 21/58 160/24 |
| 4,017,770 A | | 4/1977 | Valfre | |
| 4,097,013 A | | 6/1978 | Broome | |
| 4,111,575 A | | 9/1978 | Hoshino | |
| 4,228,489 A | | 10/1980 | Martin | |
| 4,268,894 A | | 5/1981 | Bartunek et al. | |
| 4,324,477 A | | 4/1982 | Miyazaki | |
| 4,430,017 A | | 2/1984 | Stefancich | |
| 4,470,106 A | | 9/1984 | Norton | |
| 4,744,690 A | | 5/1988 | Hsieh | |
| 5,203,621 A | | 4/1993 | Weinmeister et al. | |
| 5,207,747 A | | 5/1993 | Gordin et al. | |
| 5,319,365 A | | 6/1994 | Hillinger | |
| 5,396,162 A | | 3/1995 | Brilmyer | |
| 5,400,234 A | | 3/1995 | Yu | |
| 5,405,134 A | | 4/1995 | Wolfram | |
| 5,428,520 A | | 6/1995 | Skeif | |
| 5,541,822 A | | 7/1996 | Bamber | |
| 5,630,660 A | | 5/1997 | Chen | |
| 5,684,452 A | | 11/1997 | Wang | |
| 5,713,662 A | | 2/1998 | Kira | |
| 5,934,628 A | | 8/1999 | Bosnakovic | |
| 5,964,524 A | | 10/1999 | Qian | |
| 6,045,240 A | | 4/2000 | Hochstein | |
| 6,045,288 A | | 4/2000 | Pasternak et al. | |
| D428,176 S | | 7/2000 | Bamber et al. | |
| 6,092,911 A | | 7/2000 | Baker, III et al. | |
| 6,099,142 A | | 8/2000 | Liu | |
| 6,142,699 A | | 11/2000 | Pao | |
| 6,149,283 A | | 11/2000 | Conway et al. | |
| 6,213,626 B1 | | 4/2001 | Qian | |
| 6,255,786 B1 | | 7/2001 | Yen | |
| 6,265,969 B1 | | 7/2001 | Shih | |
| 6,312,184 B1 | | 11/2001 | Hoshino | |
| D452,022 S | | 12/2001 | Osiecki et al. | |
| 6,326,882 B1 | | 12/2001 | Chiu et al. | |
| 6,367,949 B1 | | 4/2002 | Pederson | |
| 6,379,023 B1 | | 4/2002 | Passno | |
| 6,461,017 B2 | | 10/2002 | Selkee | |
| 6,474,844 B1 | | 11/2002 | Ching | |
| 6,554,459 B2 | | 4/2003 | Yu et al. | |
| 6,637,904 B2 | | 10/2003 | Hernandez | |
| 6,736,531 B2 | | 5/2004 | Wallach | |
| 6,799,335 B1 | | 10/2004 | Zadro | |
| 6,824,297 B1 | | 11/2004 | Lee | |
| 6,854,862 B1 | | 2/2005 | Hopf | |
| 6,857,756 B2 | | 2/2005 | Reiff et al. | |
| 6,873,249 B2 | * | 3/2005 | Chu ......................... | B60Q 7/00 116/63 P |
| 6,899,441 B2 | | 5/2005 | Chen | |
| D506,847 S | | 6/2005 | Hussaini et al. | |
| 6,902,294 B2 | | 6/2005 | Wright | |
| 6,877,881 B2 | | 8/2005 | Tsao | |
| 6,926,428 B1 | | 8/2005 | Lee | |
| 6,933,686 B1 | | 8/2005 | Bishel | |
| 7,001,044 B2 | | 2/2006 | Leen | |
| 7,001,047 B2 | | 2/2006 | Holder et al. | |
| 7,011,280 B2 | | 3/2006 | Murray et al. | |
| 7,026,729 B2 | | 4/2006 | Homan et al. | |
| 7,063,444 B2 | | 6/2006 | Lee et al. | |
| 7,073,926 B1 | | 7/2006 | Kremers et al. | |
| 7,084,531 B2 | | 8/2006 | Bruwer | |
| D532,536 S | | 11/2006 | Krieger et al. | |
| 7,152,997 B1 | | 12/2006 | Kovacik et al. | |
| 7,153,004 B2 | | 12/2006 | Galli | |
| 7,194,358 B2 | | 3/2007 | Callaghan et al. | |
| 7,195,377 B2 | | 3/2007 | Tsai | |
| 7,207,689 B2 | | 4/2007 | Tait | |
| 7,224,271 B2 | | 5/2007 | Wang | |
| 7,246,927 B2 | | 7/2007 | Wikle et al. | |
| D552,660 S | | 10/2007 | Lee | |
| D553,281 S | | 10/2007 | Rugendyke et al. | |
| D553,771 S | | 10/2007 | Watson et al. | |
| 7,278,761 B2 | | 10/2007 | Kuan | |
| 7,293,934 B1 | | 11/2007 | Huang | |
| 7,294,977 B1 | | 11/2007 | Eusterbrock et al. | |
| 7,365,320 B2 | | 4/2008 | Van Deursen et al. | |
| 7,367,695 B2 | | 5/2008 | Shiau | |
| 7,395,830 B2 | * | 7/2008 | Seo ......................... | E04H 15/46 403/324 |
| 7,466,040 B2 | | 12/2008 | Bruwer | |
| 7,470,036 B2 | | 12/2008 | Deighton et al. | |
| 7,484,858 B2 | | 2/2009 | Deighton et al. | |
| 7,503,530 B1 | | 3/2009 | Brown | |
| 7,566,151 B2 | | 7/2009 | Whelan et al. | |
| 7,618,154 B2 | | 11/2009 | Rosiello | |
| 7,638,970 B1 | | 12/2009 | Gebhard et al. | |
| 7,670,034 B2 | | 3/2010 | Zhang et al. | |
| D623,786 S | | 9/2010 | Wessel | |
| 7,837,344 B2 | | 11/2010 | Altonen et al. | |
| 7,857,486 B2 | | 12/2010 | Long et al. | |
| 7,859,136 B2 | | 12/2010 | Blair et al. | |
| 7,874,303 B2 | * | 1/2011 | Xie ......................... | E04H 15/46 135/120.3 |
| 7,914,178 B2 | | 3/2011 | Xiang et al. | |
| 7,914,182 B2 | | 3/2011 | Mrakovich et al. | |
| D643,138 S | | 8/2011 | Kawase et al. | |
| 7,988,335 B2 | | 8/2011 | Liu et al. | |
| 7,990,062 B2 | | 8/2011 | Liu | |
| 7,997,753 B2 | | 8/2011 | Walesa et al. | |

(56) References Cited

U.S. PATENT DOCUMENTS 8,007,128 B2 8/2011 Wu et al.
8,007,145 B2 8/2011 Leen
8,029,169 B2 10/2011 Liu
8,047,481 B2 11/2011 Shen
8,047,498 B1 11/2011 Karty
8,087,797 B2 1/2012 Pelletier et al.
8,141,827 B2 * 3/2012 Lin .................... F16M 11/242 248/170
8,142,045 B2 3/2012 Peak
8,167,466 B2 5/2012 Liu
8,201,979 B2 6/2012 Deighton et al.
8,220,968 B2 7/2012 Hartmann, Jr. et al.
D665,521 S 8/2012 Werner et al.
8,235,552 B1 8/2012 Tsuge
8,262,248 B2 9/2012 Wessel
8,294,340 B2 10/2012 Yu et al.
8,322,892 B2 12/2012 Scordino et al.
8,328,398 B2 12/2012 Van Deursen
8,330,337 B2 12/2012 Yu et al.
8,366,290 B2 2/2013 Maglica
8,403,522 B2 3/2013 Chang
8,425,091 B2 4/2013 Chen
8,439,531 B2 5/2013 Trott et al.
8,465,178 B2 6/2013 Wilcox et al.
8,547,022 B2 10/2013 Summerford et al.
D695,434 S 12/2013 Shen
8,599,097 B2 12/2013 Intravatola
8,608,118 B2 12/2013 Lai
D698,471 S 1/2014 Poon
D699,874 S 2/2014 Chilton et al.
8,651,438 B2 2/2014 Deighton et al.
8,659,443 B2 2/2014 Mandel
8,696,177 B1 4/2014 Frost
D705,467 S 5/2014 Aglassinger
D708,376 S 7/2014 Crowe et al.
8,801,226 B2 8/2014 Moore
8,832,910 B2 9/2014 Lah
8,833,985 B2 9/2014 Robertson et al.
8,858,026 B2 10/2014 Lee et al.
D720,384 S 12/2014 Holmen
8,931,932 B2 1/2015 Lipscomb et al.
8,939,602 B2 1/2015 Wessel
8,979,331 B2 3/2015 Lee et al.
D726,354 S 4/2015 Davies
D728,402 S 5/2015 Case
D730,553 S 5/2015 Naksen
9,068,736 B2 6/2015 Lee et al.
D743,603 S 11/2015 Inskeep
9,222,633 B2 12/2015 Inskeep
D747,263 S 1/2016 Lafferty
9,380,844 B1 7/2016 Luo
D770,657 S 11/2016 Fang
9,605,816 B2 3/2017 Lin et al.
9,631,656 B2 4/2017 Sato
9,764,458 B1 9/2017 Resh
9,810,408 B2 11/2017 Fang
9,816,661 B2 11/2017 Sharrah et al.
10,634,327 B2 4/2020 Cornell et al.
10,907,809 B2 2/2021 Harvey et al.
11,112,096 B2 * 9/2021 Harvey ................ F21V 17/007
11,306,904 B1 4/2022 Harvey et al.
2002/0030146 A1 3/2002 Akaike
2002/0126492 A1 9/2002 Ching
2002/0136005 A1 9/2002 Lee
2002/0163811 A1 11/2002 Sipala
2002/0167814 A1 11/2002 Ching
2002/0172043 A1 11/2002 Ching
2003/0090904 A1 5/2003 Ching
2003/0137847 A1 7/2003 Cooper
2003/0174503 A1 9/2003 Yeuh
2005/0030737 A1 2/2005 Chen
2005/0036308 A1 2/2005 Wright
2005/0117340 A1 * 6/2005 Lee ........................ F21L 14/00 362/249.16
2005/0285757 A1 12/2005 Wang
2006/0007682 A1 1/2006 Reiff, Jr. et al.
2006/0061991 A1 3/2006 Yeh
2006/0067077 A1 3/2006 Kumthampinij et al.
2006/0146550 A1 7/2006 Simpson et al.
2006/0250745 A1 11/2006 Butler et al.
2006/0279948 A1 12/2006 Tsai
2006/0285323 A1 12/2006 Fowler
2007/0103907 A1 5/2007 Popowich et al.
2007/0211470 A1 9/2007 Huang
2007/0223239 A1 9/2007 Thompson et al.
2007/0252067 A1 11/2007 Lee
2007/0297167 A1 12/2007 Greenhoe
2008/0112170 A1 5/2008 Trott et al.
2008/0158887 A1 7/2008 Zhu et al.
2008/0165537 A1 7/2008 Shiau
2008/0198588 A1 8/2008 O'Hern
2008/0253125 A1 10/2008 Kang et al.
2008/0302933 A1 12/2008 Cardellini
2009/0040774 A1 2/2009 Avila et al.
2009/0058315 A1 3/2009 Baeumle
2009/0080205 A1 3/2009 Chang et al.
2009/0134191 A1 5/2009 Phillips
2009/0135594 A1 5/2009 Yu et al.
2009/0152413 A1 6/2009 Takegawa
2009/0161375 A1 6/2009 Li et al.
2009/0206226 A1 8/2009 Forrest et al.
2009/0303717 A1 12/2009 Long et al.
2010/0027260 A1 2/2010 Liu
2010/0027269 A1 2/2010 Lo et al.
2010/0039792 A1 2/2010 Meyers et al.
2010/0039801 A1 2/2010 Pelletier et al.
2010/0072897 A1 3/2010 Zheng
2010/0080005 A1 4/2010 Gattari
2010/0091495 A1 4/2010 Patrick
2010/0142213 A1 6/2010 Bigge et al.
2010/0277899 A1 11/2010 Peak
2010/0315824 A1 12/2010 Chen
2010/0328951 A1 12/2010 Boissevain
2011/0031887 A1 2/2011 Stoll et al.
2011/0036694 A1 2/2011 Daffin, III
2011/0038144 A1 2/2011 Chang
2011/0050070 A1 3/2011 Pickard
2011/0058367 A1 3/2011 Shiau et al.
2011/0075404 A1 3/2011 Allen et al.
2011/0121727 A1 5/2011 Sharrah et al.
2011/0122605 A1 * 5/2011 Deighton ............... F16M 11/10 362/183
2011/0211340 A1 9/2011 Smith
2011/0228524 A1 9/2011 Greer
2011/0286216 A1 11/2011 Araman
2011/0317420 A1 12/2011 Jeon et al.
2012/0026729 A1 2/2012 Sanchez et al.
2012/0033400 A1 2/2012 Remus et al.
2012/0033429 A1 2/2012 Van De Ven
2012/0044707 A1 2/2012 Breidenassel
2012/0048511 A1 3/2012 Moshtagh
2012/0049717 A1 3/2012 Lu
2012/0057351 A1 3/2012 Wilcox et al.
2012/0087118 A1 4/2012 Bailey et al.
2012/0087125 A1 4/2012 Liu
2012/0098437 A1 4/2012 Smed
2012/0120674 A1 5/2012 Jonker
2012/0140455 A1 6/2012 Chang
2012/0155104 A1 6/2012 Jonker
2012/0188776 A1 7/2012 Chen
2012/0212963 A1 8/2012 Jigamian
2012/0234519 A1 9/2012 Lee
2012/0236551 A1 9/2012 Sharrah et al.
2012/0247735 A1 10/2012 Ito et al.
2012/0261530 A1 10/2012 Deighton et al.
2012/0262917 A1 10/2012 Courcelle
2012/0300487 A1 11/2012 Jonker
2013/0032323 A1 2/2013 Hsu
2013/0039081 A1 2/2013 Czipri et al.
2013/0058078 A1 3/2013 Meng
2013/0077296 A1 3/2013 Goeckel et al.
2013/0094196 A1 4/2013 Wessel
2013/0128565 A1 5/2013 Cugini et al.
2013/0176713 A1 7/2013 Deighton et al.

(56) References Cited

U.S. PATENT DOCUMENTS

| | | | | |
|---|---|---|---|---|
| 2013/0187785 | A1 | 7/2013 | McIntosh et al. | |
| 2013/0258645 | A1 | 10/2013 | Weber et al. | |
| 2013/0265780 | A1 | 10/2013 | Choski et al. | |
| 2013/0322073 | A1 | 12/2013 | Hamm et al. | |
| 2014/0049953 | A1* | 2/2014 | Moore | F21V 21/145 362/220 |
| 2014/0140050 | A1 | 5/2014 | Wong et al. | |
| 2014/0192543 | A1 | 7/2014 | Deighton et al. | |
| 2014/0218936 | A1 | 8/2014 | Mahling et al. | |
| 2014/0268775 | A1 | 9/2014 | Kennemer et al. | |
| 2014/0301066 | A1* | 10/2014 | Inskeep | F21S 9/02 362/183 |
| 2014/0307443 | A1 | 10/2014 | Clifford et al. | |
| 2014/0376216 | A1 | 12/2014 | McLoughlin et al. | |
| 2015/0023771 | A1 | 1/2015 | Carr et al. | |
| 2015/0233569 | A1 | 8/2015 | Xue et al. | |
| 2015/0233571 | A1 | 8/2015 | Inan et al. | |

FOREIGN PATENT DOCUMENTS

| | | | |
|---|---|---|---|
| EP | 2436641 | A1 | 4/2012 |
| GB | 2424694 | A | 10/2006 |
| KR | 20100116933 | A | 11/2010 |
| WO | 2002044503 | A1 | 6/2002 |
| WO | 2014083117 | A1 | 6/2014 |
| WO | 2014207595 | A1 | 12/2014 |

* cited by examiner

STAND LIGHT

CROSS-REFERENCE TO RELATED APPLICATIONS

This application is a continuation of U.S. patent application Ser. No. 17/713,689, filed on Apr. 5, 2022, now U.S. Pat. No. 11,725,807, which is a continuation of U.S. patent application Ser. No. 17/545,381, filed on Dec. 8, 2021, now U.S. Pat. No. 11,306,904, which is a continuation of U.S. patent application Ser. No. 17/465,965, filed Sep. 3, 2021, now U.S. Pat. No. 11,530,799, which is a continuation of U.S. patent application Ser. No. 15/686,990, filed Aug. 25, 2017, now U.S. Pat. No. 11,112,096, which is a continuation of U.S. patent application Ser. No. 14/877,675, filed Oct. 7, 2015, now U.S. Pat. No. 10,378,739, which claims priority to U.S. Provisional Patent Application No. 62/152,089, filed Apr. 24, 2015, and the entire contents of all of which are incorporated by reference herein.

BACKGROUND

The present invention relates to work lights and, more particularly, to work lights including foldable stands. Area work lights are typically used to provide light to remote work areas or job sites that do not have sufficient ambient lighting. Some work lights are compact or configurable into compact configurations, allowing the work lights to be to be repositioned and easily transported to and from job sites.

SUMMARY

In one embodiment, the invention provides a portable light including an elongate body having a longitudinal axis, a light head coupled to an end of the elongate body, a handle movable along the elongate body between a first position and a second position, a collar coupled to the handle for movement with the handle between the first position and the second position, and a plurality of legs pivotably coupled to the collar. The plurality of legs is collapsed against the elongate body when the handle and the collar are in the first position and is expanded apart from the elongate body when the handle and the collar are in the second position. The portable light further including a biasing member positioned between the collar and the handle to bias the collar away from the handle.

In another embodiment, the invention provides a portable light including an elongate body having a first elongate member, a second elongate member, and a longitudinal axis. The first elongate member and the second elongate member are coaxial with the longitudinal axis. The first elongate member is axially movable relative to the second elongate member between a retracted position and an extended position. The portable light further includes a light head coupled to an end of the first elongate member, a handle movable along the elongate body between a first position and a second position, a collar coupled to the handle for movement with the handle between the first position and the second position, and a plurality of legs pivotably coupled to the collar. The plurality of legs is collapsed against the elongate body when the handle and the collar are in the first position and is expanded apart from the elongate body when the handle and the collar are in the second position. The portable light also includes a wiper positioned between the first elongate member and the second elongate member. The wiper contacts the first elongate member to impede axial movement of the first elongate member relative to the second elongate member.

In yet another embodiment, the invention provides a portable light including a body, a light supported by the body, a first power input supported by the body and electrically coupled to the light, and a second power input supported by the body and electrically coupled to the light. The first power input is configured to selectively receive power from a first power source. The second power input is configured to selectively receive power from a second power source. The portable light further includes a user interface supported by the body and having an actuator operable to control operation of the light, and a first indicator corresponding to the first power input. The first indicator is activated when the light is powered through the first power input. The user interface further has a second indicator corresponding to the second power input. The second indicator is activated when the light is powered through the second power input.

Other aspects of the invention will become apparent by consideration of the detailed description and accompanying drawings.

DETAILED DESCRIPTION

Figure 1:
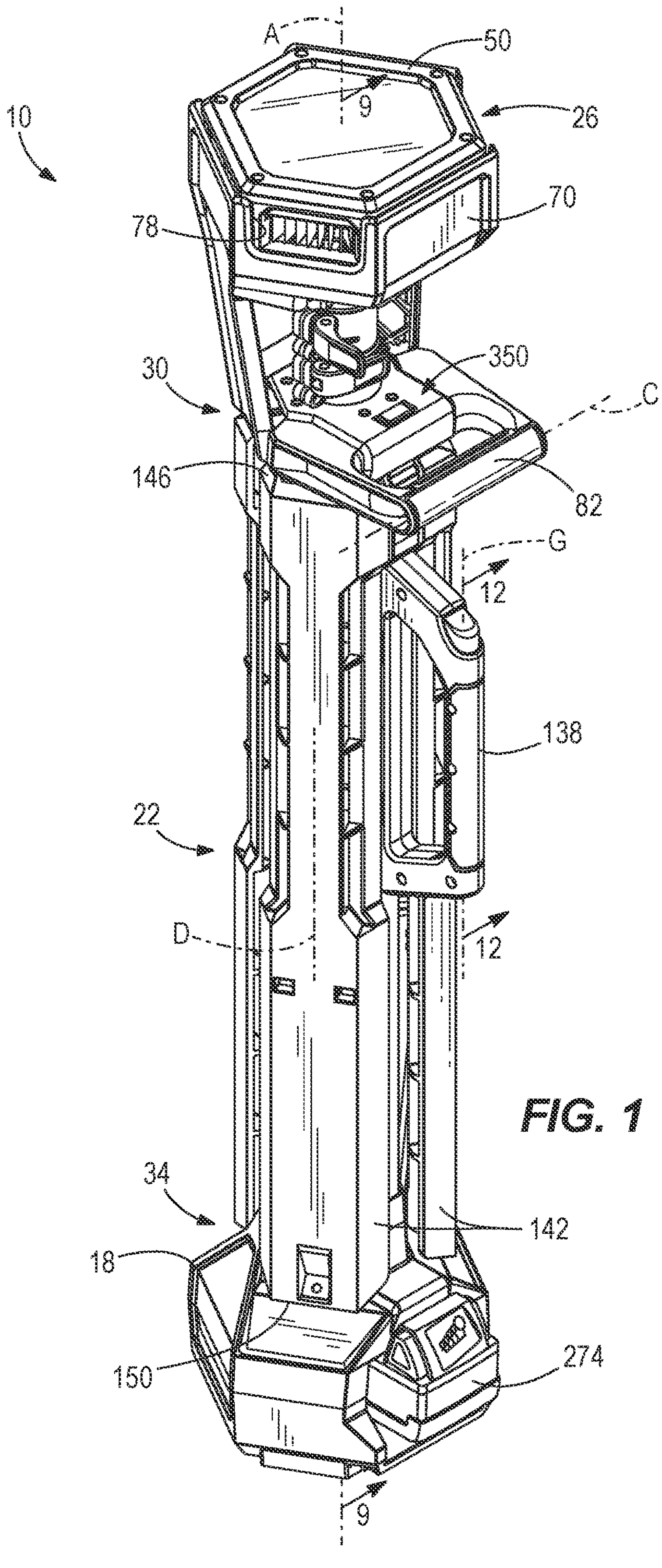
FIG. 1 is a perspective view of a stand light, the stand light including a support assembly in a collapsed position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

Figure 2:
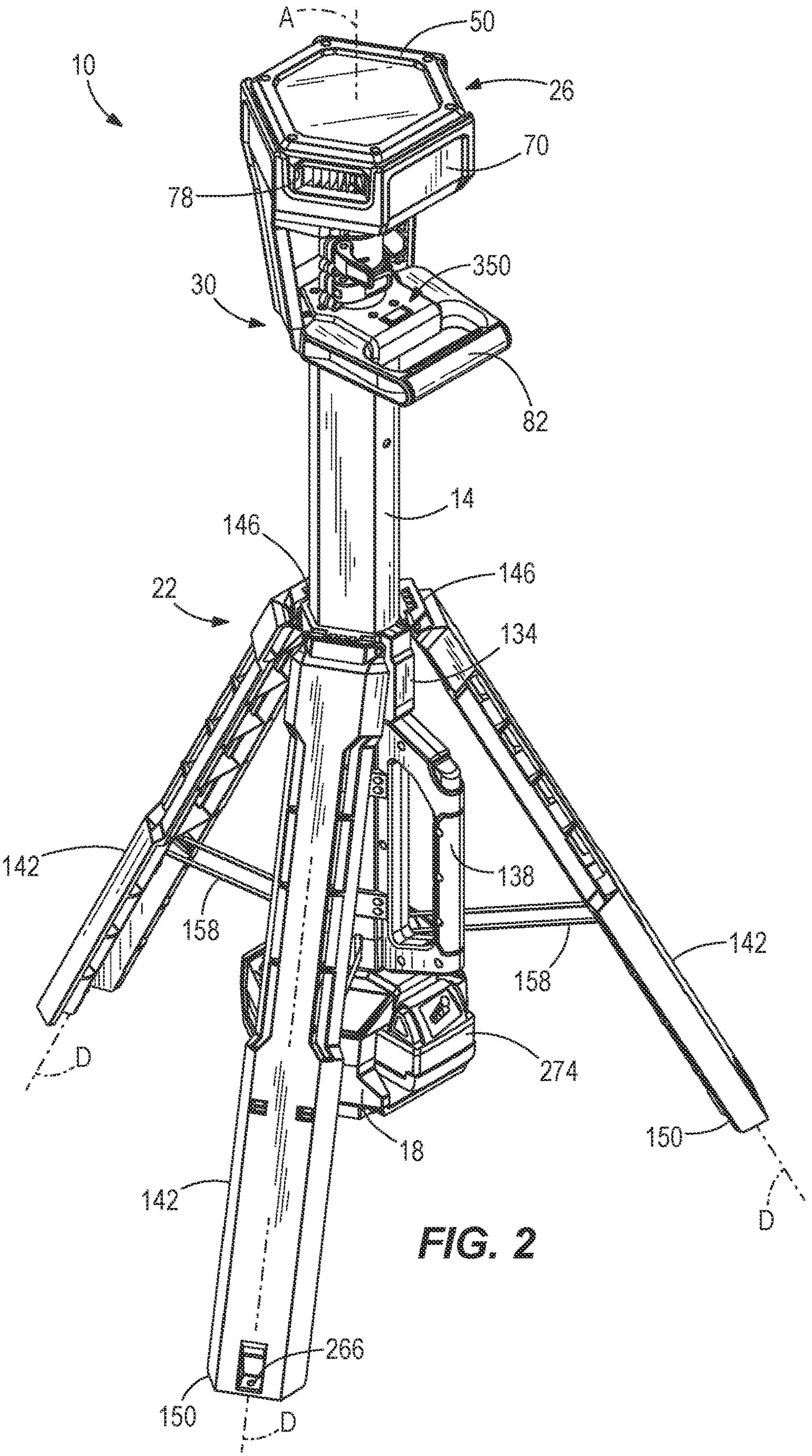
FIG. 2 is a perspective view of the stand light of FIG. 1, illustrating the support assembly in an expanded position.

FIGS. 1-2 illustrate a stand light 10 including an elongate body 14, a base housing 18, a support assembly 22, and a light head or head assembly 26. The stand light 10 is configurable in either a collapsed position, as shown in FIG. 1, or an expanded, operating position, as shown in FIG. 2. In the collapsed position, the stand light 10 is relatively compact for storing and transporting. In the operating position, the stand light 10 may be self-supported on a surface.

With continued reference to FIGS. 1-2, the elongate body 14 includes a first, top end 30 and a second, bottom end 34 opposite the top end 30. The elongate body 14 further includes a longitudinal axis A that extends through the first end 30 and the second end 34.

Figure 3:
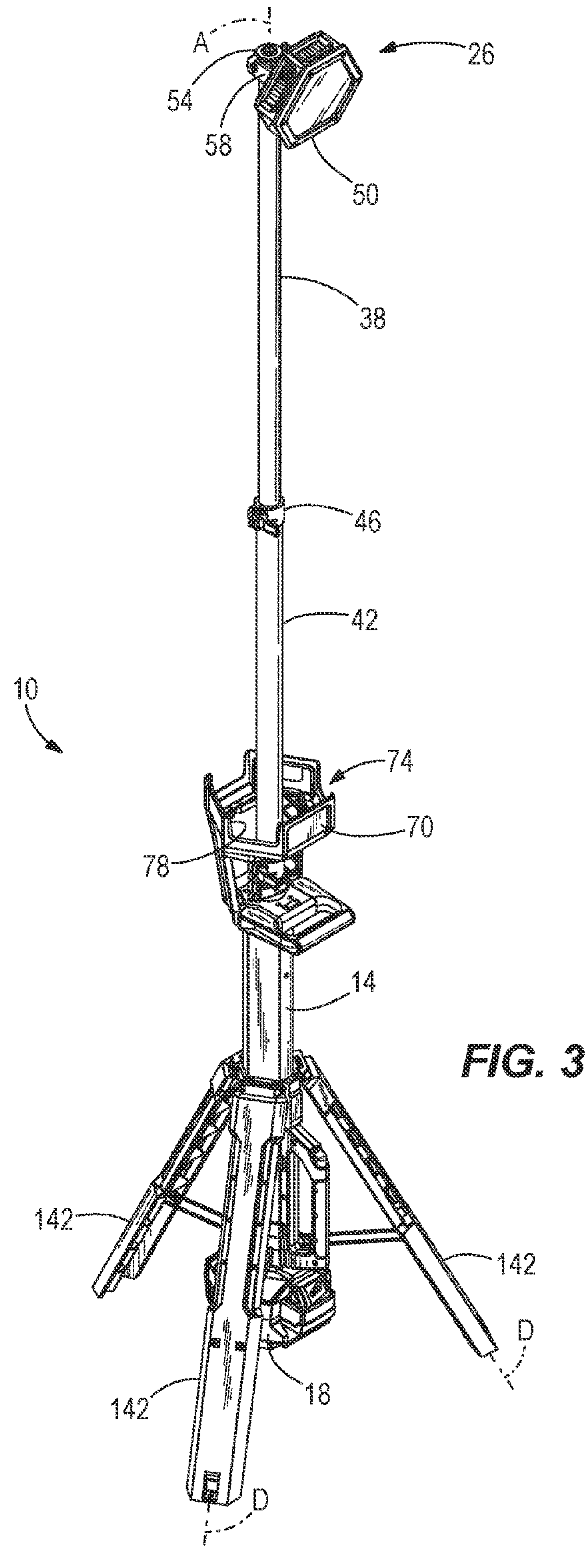
FIG. 3 is a perspective view of the stand light of FIG. 1, the stand light including telescoping members in an extended position.

With reference to FIG. 3, in the illustrated embodiment, the elongate body 14 is a telescoping body that includes a plurality of elongate telescoping members, or extension poles, to allow the body 14 to be extendable in length. The illustrated body 14 includes a first extension pole 38 and a second extension pole 42. In alternate embodiments, any number of extension poles may be used. The extension poles 38, 42 each include a longitudinal axis that is coaxial with the longitudinal axis A of the elongate body 14. Additionally, the extension poles 38, 42 are selectively secured in either an extended position (FIG. 3), a retracted position (FIGS. 1 and 2), or any position in between by a clamping assembly 46 that is movable between a clamped and unclamped position, as discussed in more detail below. In addition, an electric cord (not shown) is contained within the elongate body 14 and the extension poles 38, 42 to electrically connect the head assembly 26 with the base housing 18 to provide power to the head assembly 26.

With reference to FIGS. 1-3, in the illustrated embodiment, the head assembly 26 includes a light head 50 that contains a light source. The light source may include a plurality of light emitting diodes (LEDs) arranged in an array to provide uniform illumination of an area. In alternate embodiments, various light sources may be used in place of the LEDs. The light head 50 is coupled to a distal end 54 of the first extension pole 38, thus allowing a height of the head assembly 26 to be adjustable via the extension poles 38, 42 between the extended position and the retracted position. In addition, the light head 50 is rotatably coupled to the upper end 54 of the first extension pole 38 such that the light head 50 is rotatable about the longitudinal axis A of the body 14. In the retracted position, the head assembly 26 is adjacent the first end 30 of the body 14. The light head 50 also includes a hinge 58 to allow the light head 50 to be pivoted about a horizontal axis of the hinge 58 by more than about 180 degrees without the light head 50 contacting the light body 14. In other words, the hinge 58 provides the light head 50 with a pitch of more than about 90 degrees in both directions from the upright position shown in FIG. 2. The hinge 58 is a U-shaped hinge provided with two arms to pivotally connect to a corresponding middle hinge on the distal end 54 of the first extension pole 38. The head assembly 26 may further include a spring loaded ratchet mechanism, or another mechanism, configured with the hinge 58 to releasably secure the light head 50 in various, discrete positions about the horizontal axis of the hinge 58.

Figure 4:
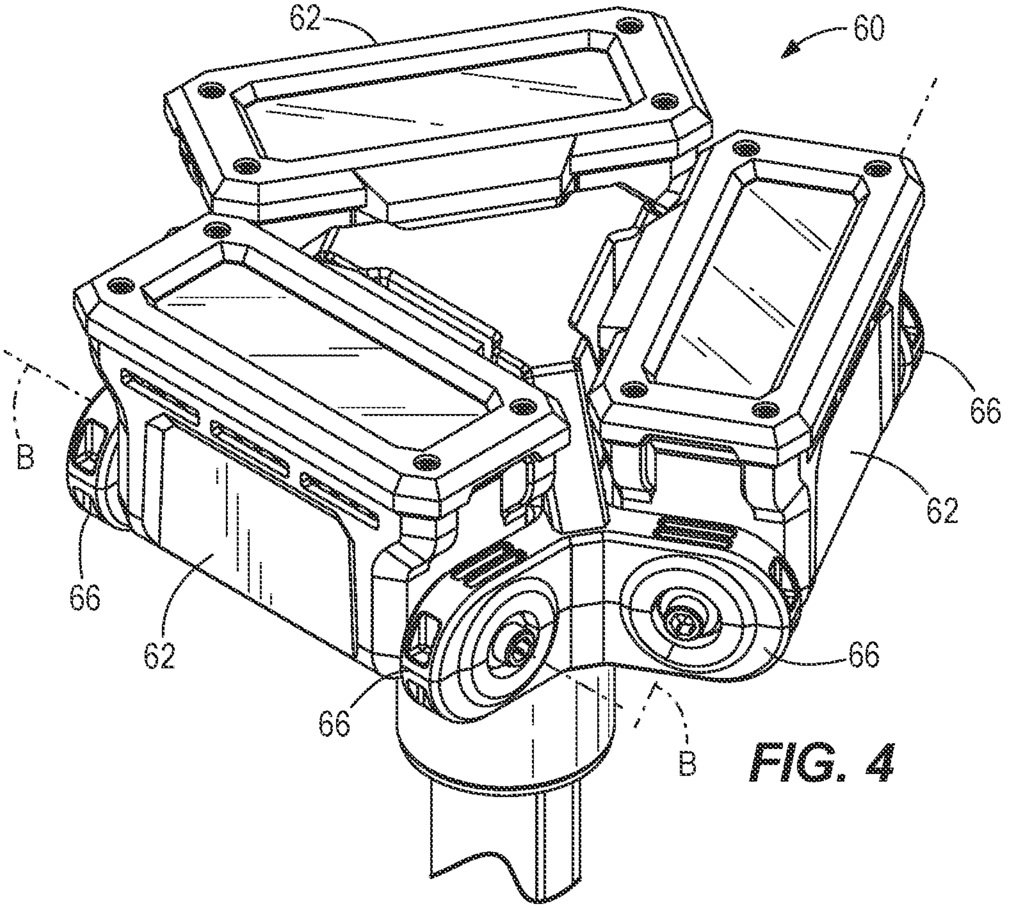
FIG. 4 is a perspective view of an alternative light head for use with the stand light, the light head including light modules pivoted into an upward facing position.
Figure 5:
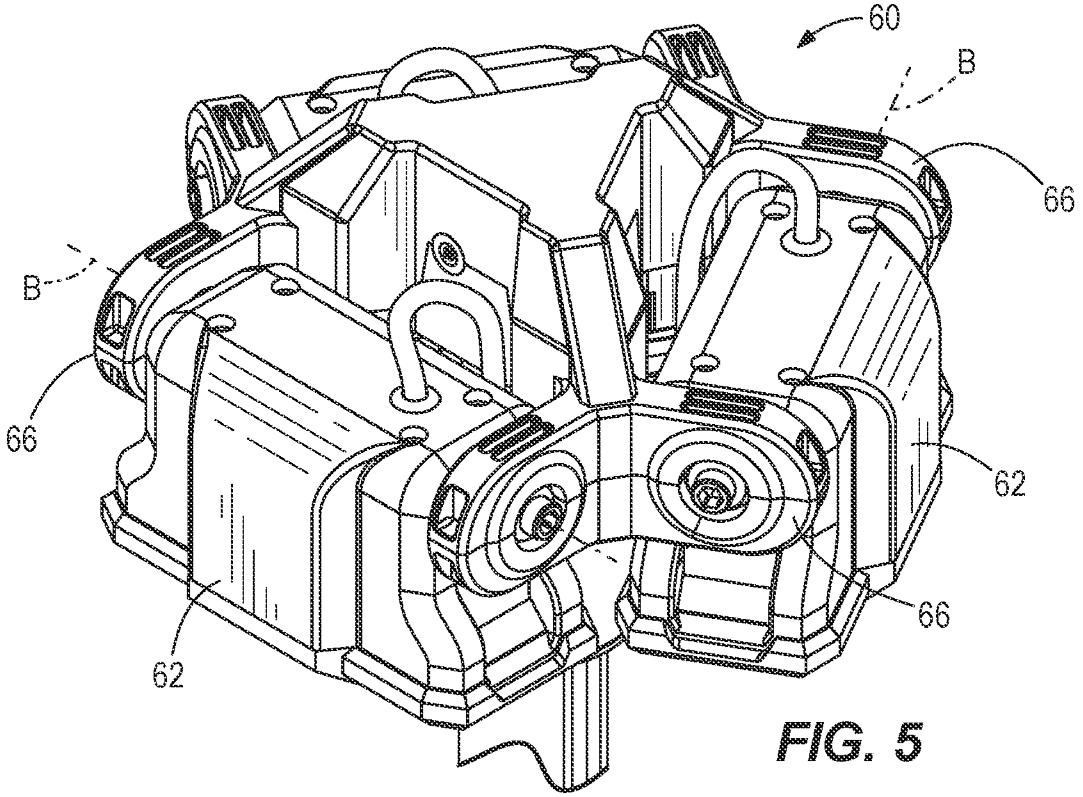
FIG. 5 is a perspective view of the light head of FIG. 4, illustrating the light modules pivoted into a downward facing position.

FIGS. 4-5 illustrate a head assembly 60 that may be used with the stand light 10 in place of the head assembly 26. The head assembly 60 includes three independent light heads 62 that are each pivotably coupled between a pair of hinge lobes 66 about a horizontal axis B. The pair of hinge lobes 66 extend horizontally outward from the head assembly 60. Each of the horizontal axes B is offset from the longitudinal axis A of the elongate body 14 and allows each of the independent light heads 62 to be independently pivoted about the corresponding horizontal axis B by more than about 180 degrees without the independent light head 62 contacting the light body 14. Each of the independent light heads 62 is pivotable between a generally upward facing direction (FIG. 4) and a generally downward facing direction (FIG. 5). Similar to the head assembly 26, the head assembly 60 of FIGS. 4-5 may further include a spring loaded ratchet mechanism, or another mechanism, configured to releasably secure each of the lights head 62 independently in various, discrete positions about the corresponding horizontal axis B.

In the illustrated embodiment, the independent light heads 62 are equally spaced circumferentially about the longitudinal axis A of the elongate body 14 by about 120 degrees. In alternate embodiments, the head assembly 26 may include any number of independent light heads 62. In addition, the head assembly 60 can include a U-shaped hinge, similar to the hinge 58 of the head assembly 26, that allows the entire head assembly 60 to pivot about a horizontal axis of the hinge by more than about 180 degrees without the head assembly 60 contacting the light body 14.

Referencing back to FIGS. 1-3, the stand light further includes a head assembly housing 70 fixed to the first end 30 of the body 14. The head assembly housing 70 includes an opening 74 to receive the head assembly 26 (or the head assembly 60) when the extension poles 38, 42 are in the retracted position (FIGS. 1-2). The head assembly housing 70 defines cutaways 78 in sidewalls of the housing 70 to provide access to the head assembly 26 so that the head assembly 26 may be pulled out of the head assembly housing 70 and the extension poles 38, 42 extended to the desired height. The cutaways 78 also facilitate cooling the head assembly after use.

The head assembly housing 70 further includes a fixed or stationary handle 82 to facilitate carrying the stand light 10 when in the collapsed position. The fixed handle 82 is secured to the elongate body 14 and has a grip axis C that is generally perpendicular to and offset from the longitudinal axis A of the elongate body 14. In addition, the handle 82 may be overmolded to provide additional grip. In alternate embodiments, the head assembly housing 70 may also include a cord hanging hook to receive and support a power or extension cord.

Figure 6:
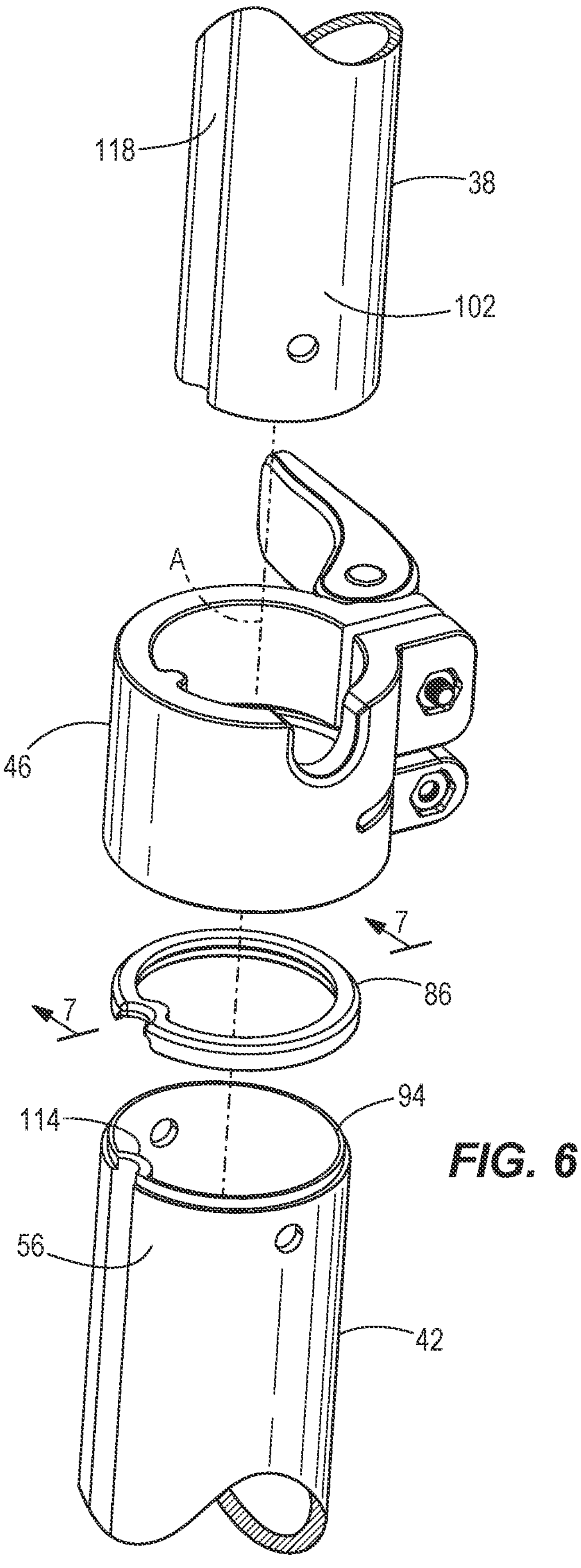
FIG. 6 is an enlarged exploded view of the telescoping members, a wiper, and a clamping assembly of the stand light of FIG. 1.
Figure 7:
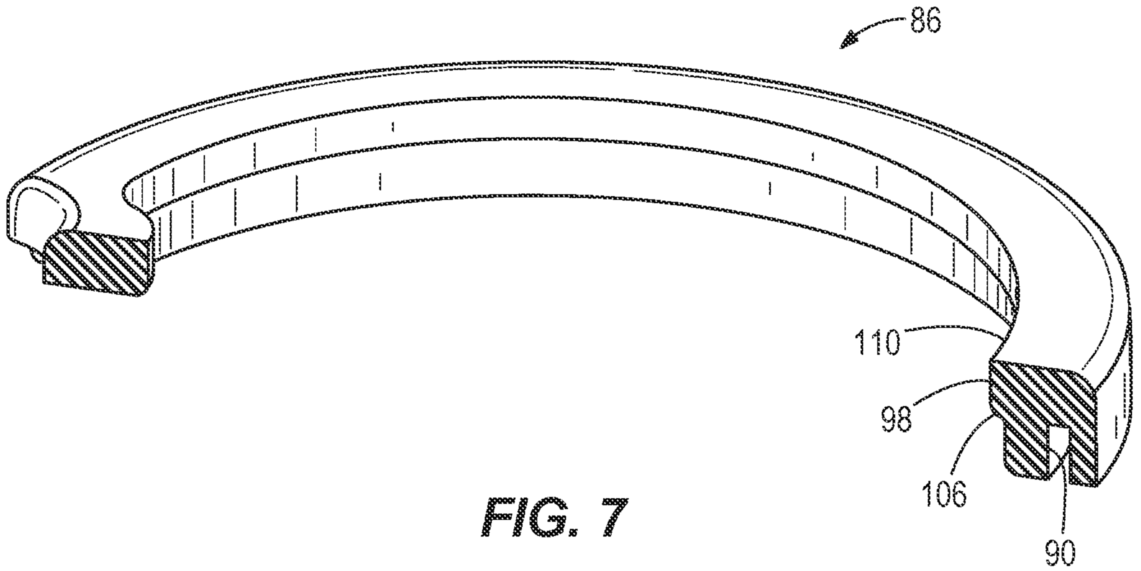
FIG. 7 is a cross-sectional perspective view of the wiper taken along line 7-7 of FIG. 6.
Figure 8:
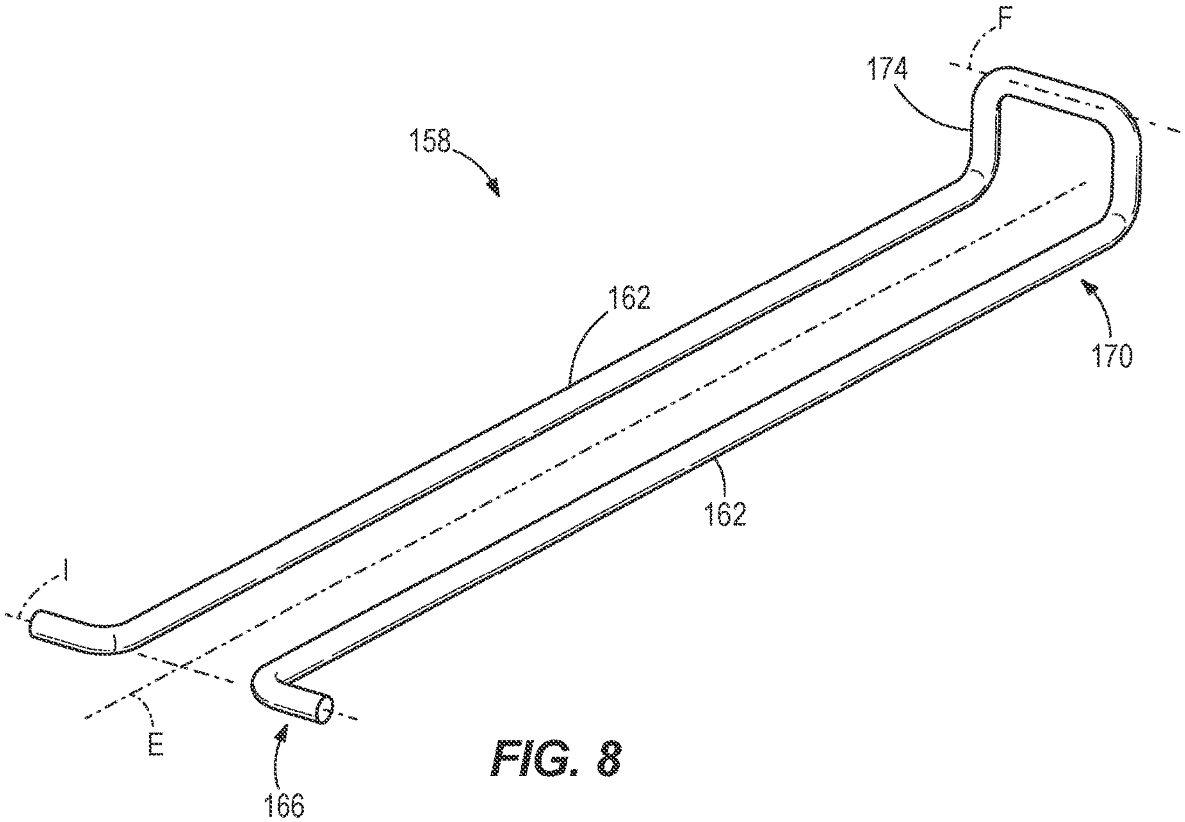
FIG. 8 is a perspective view of a leg link of the stand light of FIG. 1.

With reference to FIGS. 6-7, the stand light 10 further includes a wiper 86. The wiper 86 is positioned between the extension poles 38, 42 as a spacer to inhibit the extension poles 38, 42 from automatically moving to the retracted position. The wiper 86 is arranged to contact the first extension pole 38, thereby providing friction to impede the extension poles 38, 42 from automatically moving into the retracted position unassisted, solely through the weight of the head assembly 26 (i.e., due to gravity). In the illustrated embodiment, the wiper 86 is an annular ring member. The wiper 86 includes an annular groove 90 that receives an annular axial protrusion 94 (FIG. 6) of the extension pole 42 to couple the wiper 86 to an upper end 56 of the second extension pole 42. The wiper 86 also includes an inner annular lip 98 that protrudes inwardly towards the longitudinal axis A of the body 14 to engage an outer surface 102 of the first extension member 38. As shown in FIG. 7, the inner annular lip 98 has a sloped portion 106. The sloped portion 106 of the inner annular lip 98 allows the first extension pole 38 to be moved to the extended position with less force than to the retracted position. This is due to the outer surface 102 of the first extension pole 38 sliding on the sloped portion 106 of the inner annular lip 98 of the wiper 86 as the first extension pole 38 is moved to the extended position. However, moving the first extension pole 38 to the retracted position causes an upper edge 110 of the wiper 86 to engage the outer surface 102 of the first extension pole 38, thereby impeding movement of the first extension pole 38, and thus requiring additional force to move the first extension pole 38 to the retracted position. In addition, the wipers 86 act as gaskets to prevent dust and other contaminates from entering the elongate body 14. Although not shown, a second wiper may be similarly arranged between the second extension pole 42 and the elongate body 14. In alternate embodiments, the stand light 10 may include any number of wipers 86, the number of which may be dependent on the number of extension poles 38, 42 (e.g., one wiper between each pair of extension poles).

With reference to FIG. 6, the clamping assembly 46 is coupled to the upper end 56 of the second extension pole 42 and, as previously mentioned, is movable between a clamped position and an unclamped position. In the clamped position, the clamping assembly 46 radially compresses the wiper 86 such that the inner annular lip 98 is compressed against the first extension pole 38, thereby holding the extension poles 38, 42 in either the extended position or the retracted position. In the unclamped position, the wiper 86 is released from compression to allow relative axial movement of the extension poles 38, 42. However, as previously mentioned, when in the extended position the wiper 86 continues to provide friction to impede the extension poles 38, 42 from automatically moving to the retracted position under gravity. Thus, additional external force, such as provided by a user pushing downwardly on the head assembly 26 is required to move the extension poles 38, 42 to the retracted position.

With continued reference to FIG. 6, the extension poles 38, 42 further include corresponding anti-rotation ribs and grooves 114, 118. The anti-rotation rib 114 of the second extension member 42 is configured to be slidingly received in the groove 118 of the first extension member 38 to inhibit the extension poles 38, 42 from rotating relative to each other and the elongate body 14. In alternate embodiments, the extension poles 38, 42 may include anti-rotation clips to inhibit the extension poles 38, 42 from rotating relative to one another.

With reference to FIGS. 2, 10, and 12-13, the support assembly 22 includes a collar 134, a handle 138, and a plurality of legs 142. The collar 134 is coupled around a portion of the elongate body 14. The collar 134 is movable (e.g., slidable) along the elongate body 14 in directions parallel to the longitudinal axis A. The handle 138 is coupled to the collar 134 for movement with the collar 134 along the elongate body 14 parallel to the longitudinal axis A.

In the illustrated embodiment, the support assembly 22 includes three legs 142, each having a longitudinal axis D. In alternate embodiments, the support assembly 22 may include any number of legs 142. Each of the legs 142 has a first end 146 and a second end 150. The legs 142 are circumferentially spaced equidistant around the elongate body 14 by about 120 degrees. Each of the legs 142 is hingedly coupled at the first end 146 of the legs 142 to the collar 134 to allow the second end 150 of the legs 142 to be pivoted away from the body 14. In addition, each of the legs 142 is also pivotally coupled to the second end 34 of the body 14 by a leg link 158, which limits the outward pivotal movement of the legs 142. The legs 142 are connected to the collar 134 and the leg links 158 such that, when the collar 134 is adjacent the first end 30 of the body 14, the stand light 10 is in the collapsed position (FIG. 2). In the collapsed position, the axis D of each of the legs 142 is generally parallel with the axis A of the body 14. When the collar 134 is adjacent the second end 34 of the body 14, the stand light 10 is in the expanded, operating position (FIG. 2). In the expanded position, the legs 142 are pivoted away from the body 14 such that each of the axes D of the legs 142 forms an acute angle with the axis A of the body 14. The second end 150 of the legs 142 are spaced apart to support the stand light 10 on a surface.

In some embodiments, the legs 142 are spaced across from one another to define a base width between about 18 inches and about 40 inches, and more particularly, of about 26 inches. In addition, in the collapsed position (FIG. 1), the stand light 10 has a height of about 41 inches. In the expanded position with the extension poles 38, 42 in the retracted position (FIG. 2), the height of the stand light 10 is about 43 inches. In the expanded position with only one of the extension poles 38, 42 in an extended position, the height of the stand light is about 67 inches. In the expanded position with both the extension poles 38, 42 in a fully extended position (FIG. 3), the height of the stand light is about 92 inches.

Figure 9:
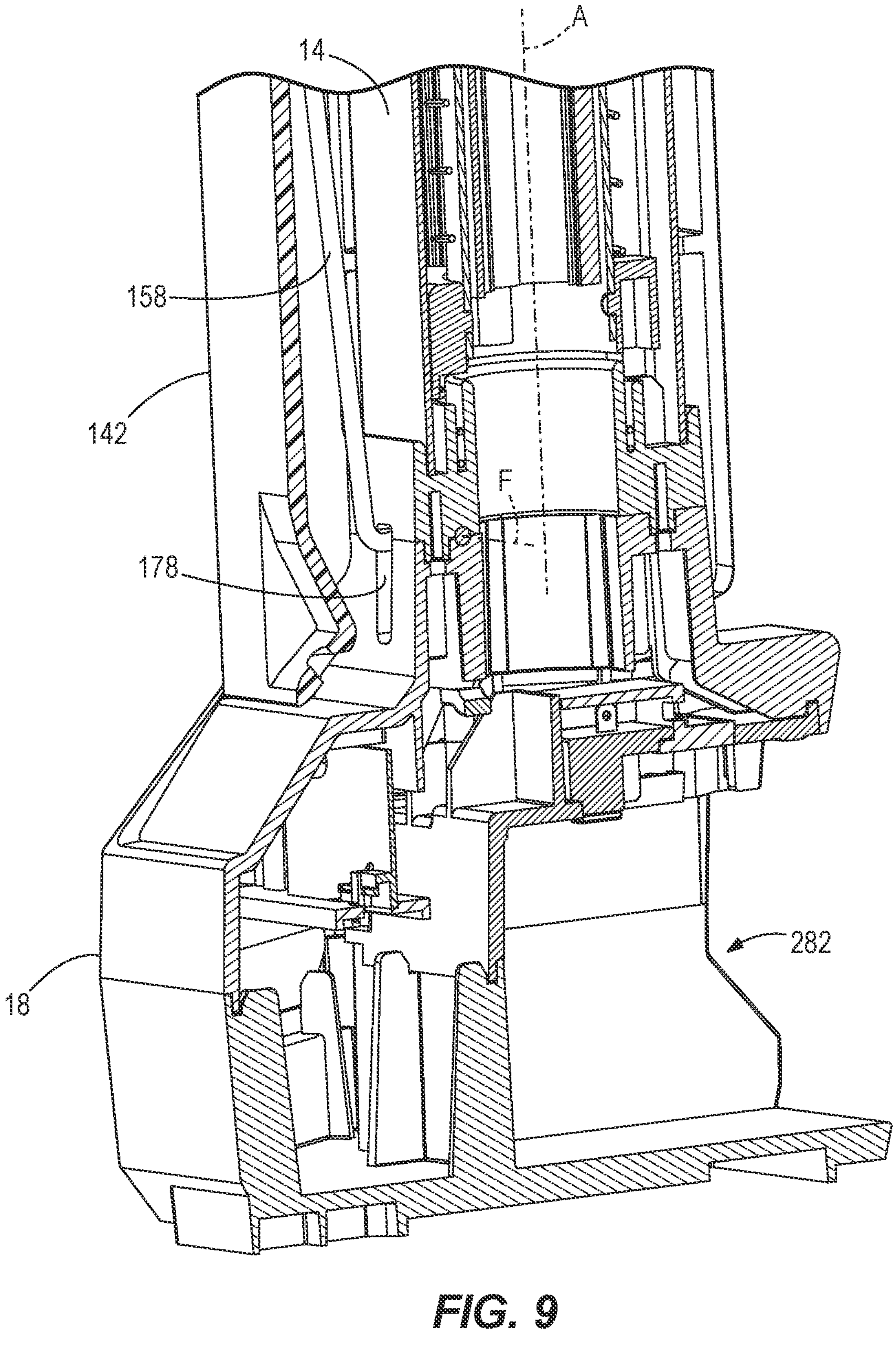
FIG. 9 is an enlarged cross-sectional perspective view of a base portion of the stand light taken along line 9-9 of FIG. 1.
Figure 10:
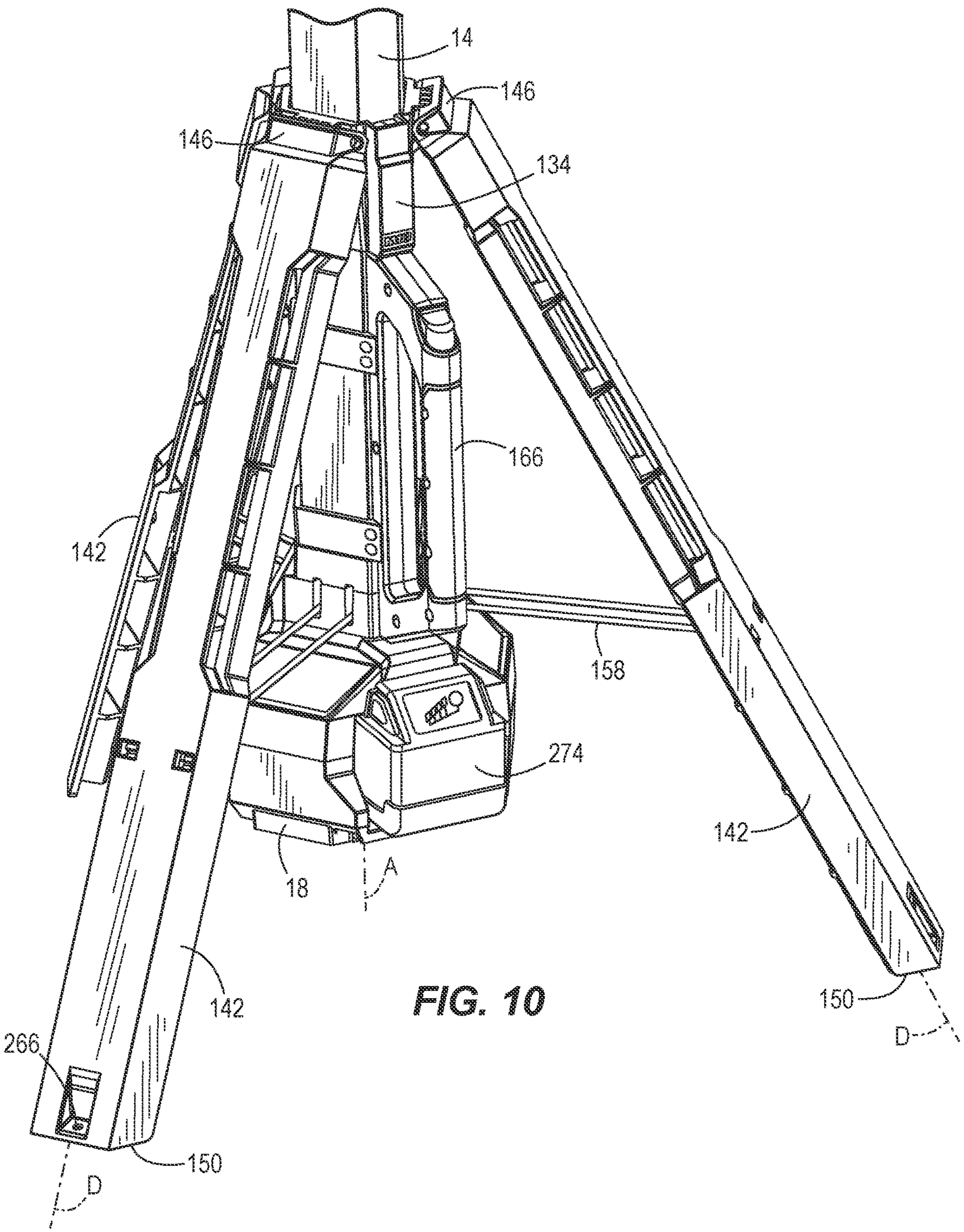
FIG. 10 is an enlarged perspective of the base portion of the stand light of FIG. 1.
Figure 11:
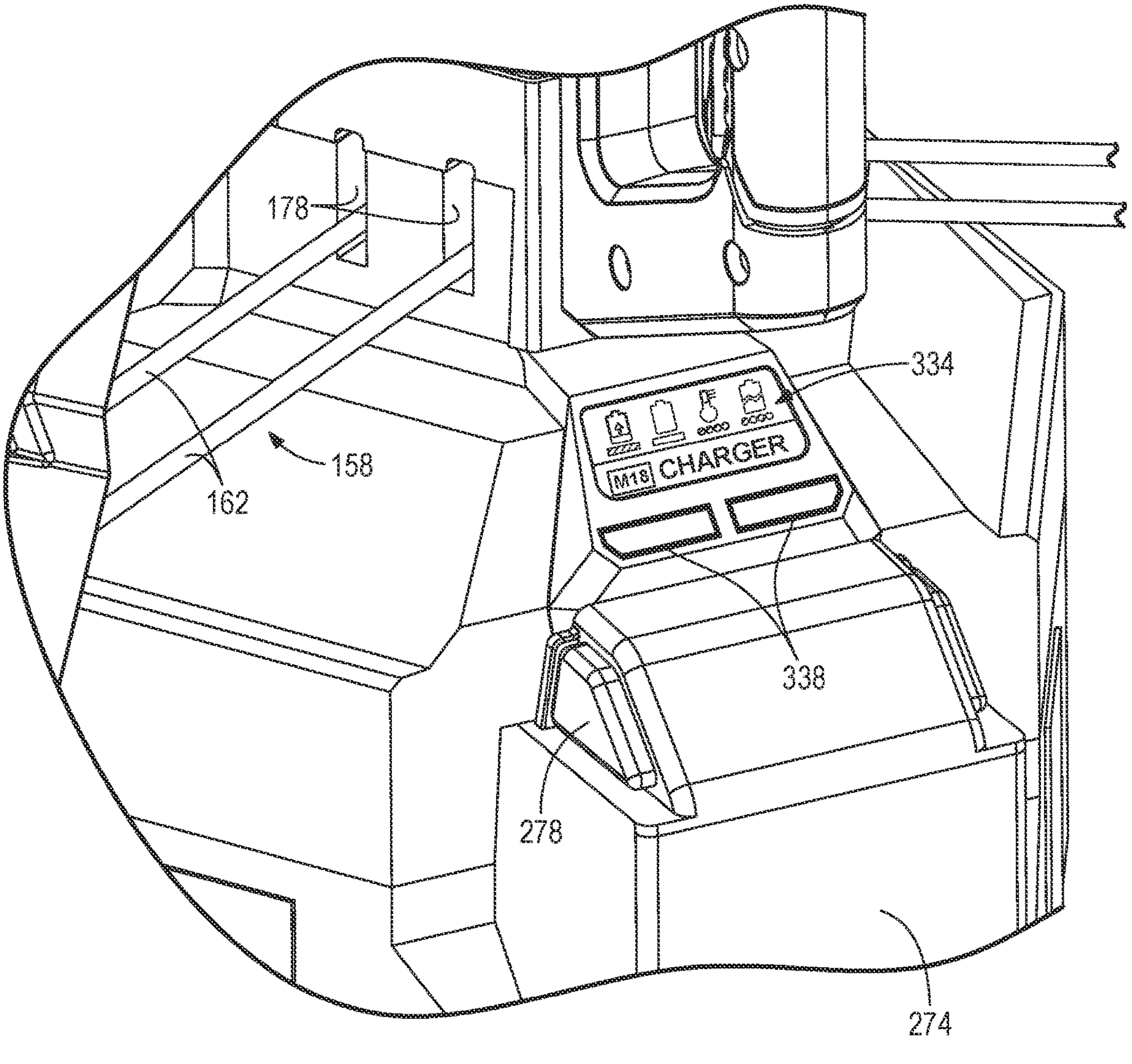
FIG. 11 is an enlarged perspective view of a portion of an alternative base portion for use with the stand light, the alternative base portion including a battery indication display.

With reference to FIG. 8-11, each of the leg links 158 has a pair of parallel members 162 and a longitudinal axis E. Each of the leg links 158 also has a first end 166 and a second end 170. The first end 166 is pivotally coupled to the corresponding one of the legs 142 about a pivot axis I. The leg link 158 has an offset portion 174 at the second end 170 that extends perpendicularly from the longitudinal axis E and connects the parallel members 162. The offset portion 174 is pivotably coupled to the elongate body 14 about an offset pivot axis F. The second offset pivot axis F is offset from the longitudinal axis E of the leg link 158. As shown in FIG. 11, the elongate body 14 further includes a pair of grooves 178 corresponding to each of the leg links 158. The pair of grooves 178 receives the offset portion 174 of one of the leg links 158. The offset portion 174 and corresponding grooves 178 allows for a full range of motion of the leg links 158. In the collapsed position, the longitudinal axis E of each leg link 158 is generally parallel to the longitudinal axis A of the elongate body 14 (FIG. 9). In the expanded position, the longitudinal axis E of each leg link 158 is substantially perpendicular to the longitudinal axis A of the elongate body 14 (FIGS. 10-11).

With reference to FIGS. 1-3, the handle 138 is coupled around the elongate body 14 and configured to slide along the body 14 parallel to the longitudinal axis A of the elongate body 14. In the illustrated embodiment, the handle 138 has a grip axis G (FIG. 1) that is generally parallel to and offset from the longitudinal axis A of the elongate body 14. The handle 138 is coupled to the collar 134 such that sliding the handle 138 along the body 14 moves the collar 134 along the body 14. In the collapsed position, the handle 138 is adjacent the first end 30 of the body 14, and while in the collapsed position, the handle 138 facilitates carrying the stand light 10. In the expanded position, the handle 138 is adjacent the second end 34 of the body 14.

Figure 12:
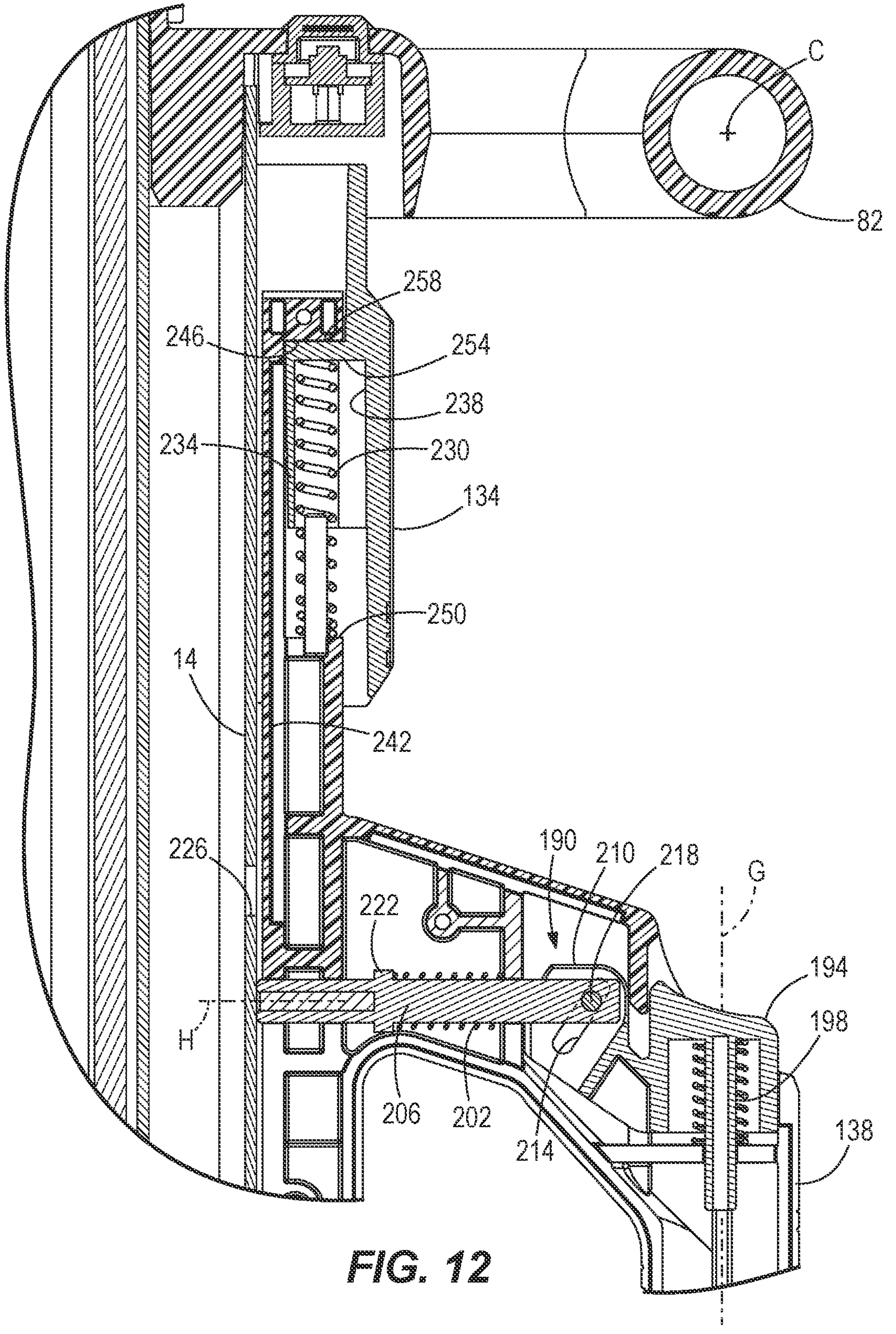
FIG. 12 is an enlarged cross-sectional view of a locking assembly of the stand light taken along line 12-12 of FIG. 1, illustrating the locking assembly in an unlocked position.
Figure 13:
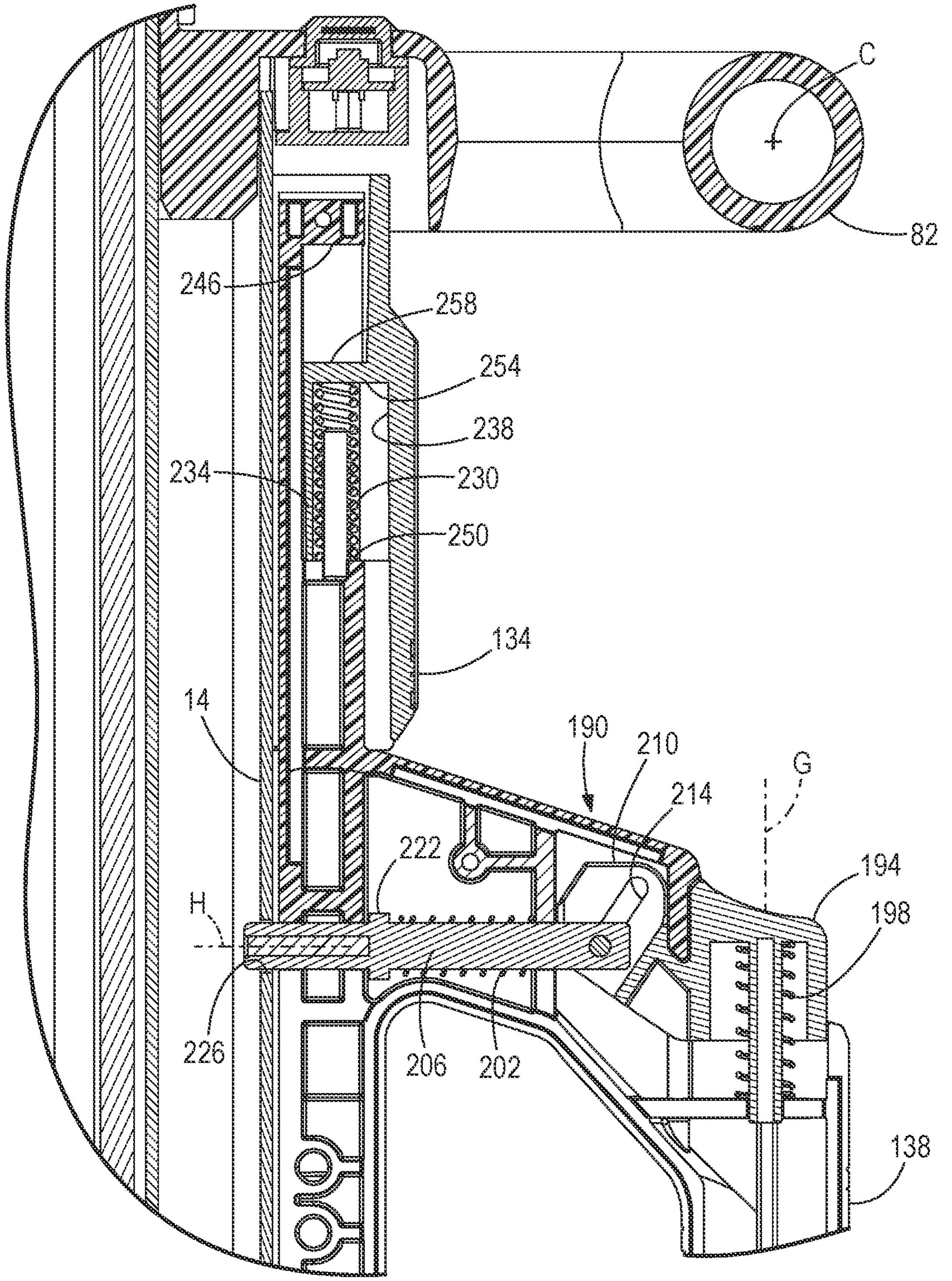
FIG. 13 is an enlarged cross-sectional view of the locking assembly of the stand light of FIG. 1, illustrating the locking assembly in a locked position.

With reference to FIGS. 12-13, the support assembly 22 further includes a locking assembly 190 having an actuator 194, a first spring 198, a second spring 202, and a locking member or pin 206. In the illustrated embodiment, the locking assembly 190 is supported by the handle 138. The locking assembly 190 further includes a cam member 210 having a cam surface 214, and a cam riding pin 218 supported by the locking pin 206. In the illustrated embodiment, the cam member 210 is integral to the actuator 194, although in other embodiments, the cam member 210 and the actuator 194 may be separate pieces. The actuator 194, the first spring 198, the second spring 202, and the locking pin 206 are arranged such that the locking pin 206 is biased into a locking position (FIG. 13). Specifically, the first spring 198 is arranged to bias the actuator 194 away from the handle 138 (i.e., upwardly in FIGS. 12 and 13) along an actuator axis that is substantially coaxial with the grip axis G. The second spring 202 is wrapped around the locking pin 206 and includes a shoulder 222 to bias the locking pin 206 away from the handle toward the body 14 along an axis H perpendicular to the longitudinal axis A of the body 14.

In the locking position (FIG. 13), the locking pin 206 is received in a first locking recess 226 defined by the body 14 to secure the support assembly 22 in the collapsed position, or in a second locking recess (not shown) to secure the support assembly 22 in the expanded position. The second locking recess is generally the same as the first locking recess 226, but positioned closer to the second end 34 of the body 14. The cam riding pin 218 of the locking pin 206 and the cam surface 214 of the actuator 194 are arranged such that as a user depresses the actuator along the actuator axis toward the second end 34 of the body 14 (i.e., downwardly in FIGS. 12 and 13), the cam surface 214 engages the cam riding pin 218. As the cam riding pin 218 follows the cam surface 214, the locking pin 206 is urged away from the body 14 out of either of the first locking recess 226 or the second recess to a released position (FIG. 12). In alternate embodiments, only one of the first spring 198 and the second spring 202 is used to bias both the locking pin 206 and the actuator 194. In some embodiments, the actuator 194 may include pistol-style trigger positioned on the underside of the handle 138 and arranged so that the user may actuate the actuator 194 with one or more of their fingers to move the locking pin 206 from the locking position to the released position. In such embodiments, the actuator 194 and the locking pin 206 may be integrally formed, such that only one of the first spring 198 and the second spring 202 is needed.

With continued reference to FIGS. 12-13, the support assembly 22 further includes a third biasing member or spring 230. The third spring 230 is positioned between the collar 134 and the handle 138. The collar 134 further includes an annular radially protruding member 234 that extends radially inwardly from the collar 134 toward the longitudinal axis A. The protruding member 234 defines a cylindrical channel 238. The handle 138 includes an axially extending member 242 having a retaining surface 246 and a seating surface 250 arranged such that the radially protruding member 234 is positioned between the retaining surface 246 and the seating surface 250. The third spring 230 is positioned within the cylindrical channel 238 of the radially protruding member 234 between the first surface 254 of the radially protruding member 234 and the seating surface 84 of the axially extending member 242.

The third spring 230 is arranged with the handle 138 such that the handle 138 is biased downwards (i.e., toward the second end 34 of the body 14 parallel to the axis A of the body 14) when in the locked position. Thus, when the locking pin 206 is released from the first locking recess 226 by actuating the actuator 194, the handle 138 is urged downwards until the retaining surface 246 of the handle 138 engages the second surface 258 of the collar 134 to begin moving the legs 142 towards the expanded position from the collapsed position. The retaining surface 246 maintains the handle 138 and the collar 134 in paired relationship. When in the expanded position and the locking pin 206 is engaged in the second locking recess, the retaining surface 246 of the handle 138 abuts the second surface 258 of the radially protruding member 234. In addition, when the stand light 10 is in the collapsed position and the locking assembly 190 is in the locking position (i.e., handle 138 is fixed in place), the third spring 230 acts upwardly on the first surface 254 of the radially protruding member 234 of the collar 134 to hold the legs 142 tightly inward and closed against the body 14. With this arrangement, movement of the legs 142 away from the body 14 is reduced and inhibited. Additionally, the third spring 230 provides tension that reduces tolerance and alignment of the locking pin 206 within the locking recesses 76 to inhibit movement of the locking pin 206 within the first locking recess 226. In alternate embodiments, a plurality of third springs 230 (or other suitable biasing elements) may be positioned circumferentially about the collar 134 to bias the collar 134 apart from the handle 138.

As shown in FIG. 2, the legs 142 also include anchor holes 266 so that the legs 142 may be secured by, for example, bolts, screws, or stakes to a surface. Additionally, the legs 142 may each include an extension member such that the legs 142 are independently adjustable in height. The legs 142 may further include cam levers to selectively clamp and release each of the extension members. Wipers, similar to those used with the extension poles 38, 42 of the body 14, may be coupled between the extension members and the internal portion of the legs 142 to create friction so that the extension members do not automatically slide out when the cam levers are moved to a release position.

Figure 14:
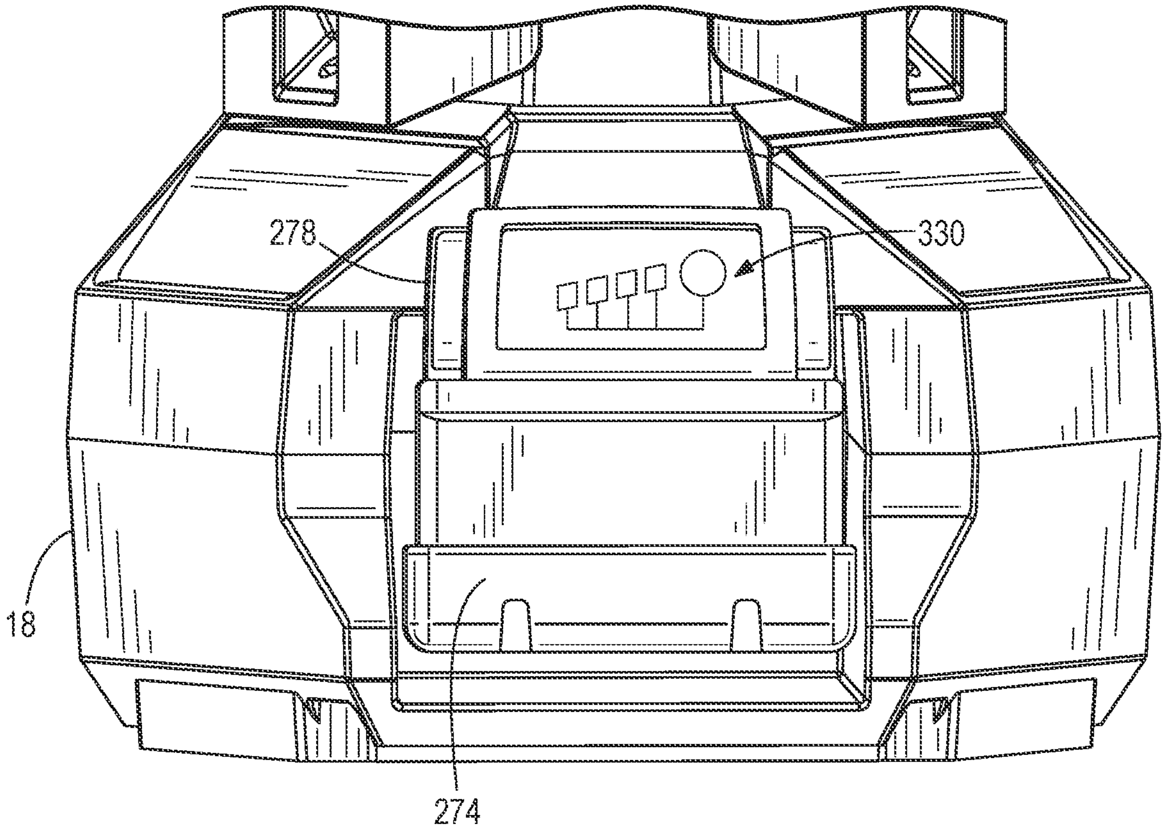
FIG. 14 is an enlarged front view of a base portion of the stand light of FIG. 1.

With reference to FIG. 14, the base housing 18 is positioned at the second end 34 of the body 14 and includes a battery pack interface defining a recess 282 (FIG. 9) that receives a battery pack 274 to power the light 10. The base housing 18 further includes a power module 300 that is electrically connected to the light head 50. The battery pack 274 provides direct current (DC) power to the stand light 10. The battery pack 274 may be electrically connected to the power module 300. The battery pack 274 further includes a latching mechanism 278 to secure the battery pack 274 within the recess 282 of the base housing 18.

The base housing 18 also includes a power inlet. The power inlet connects the light 10 to an AC power source, such as a wall outlet or generator, to power the light 10. In some embodiments, the base housing 18 may also include a power outlet. The power outlet may connect the light 10 to another device (e.g., a power tool) to power that device. In some configurations, the power outlet may connect to another stand light 10 (or other light) so that a series of lights can be daisy-chained together. If both the battery pack 274 and an AC power source are connected to the light 10, the AC power source will charge the battery pack 274 and power the light 10. If the AC power source is disconnected from the light 10, the battery pack will automatically begin powering the light 10.

Figure 15:
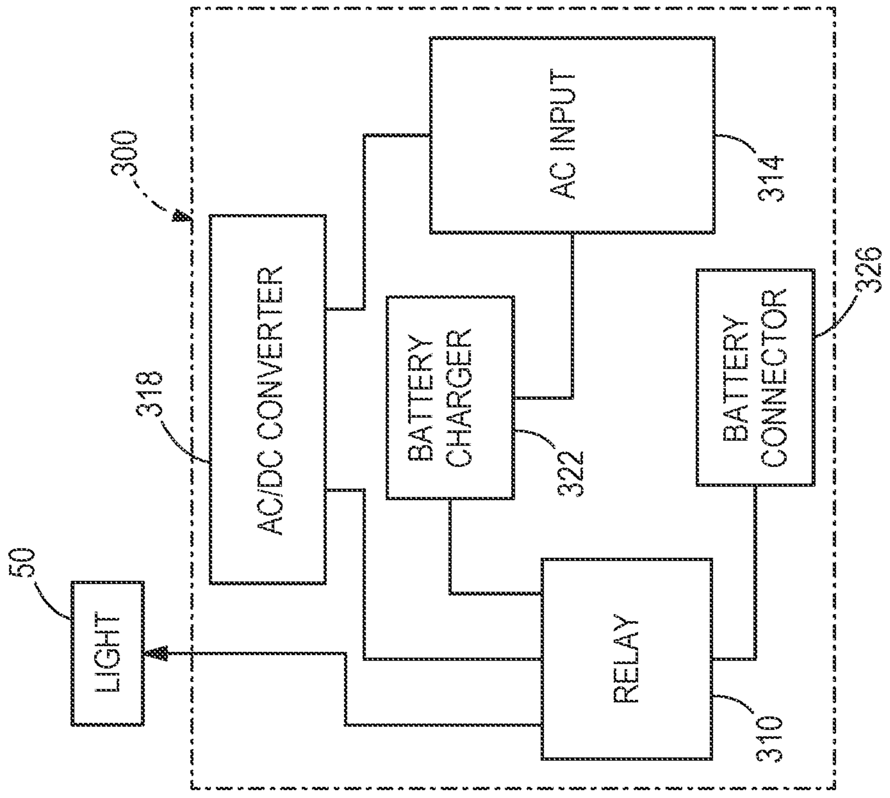
FIG. 15 is a schematic of a power module of the stand light of FIG. 1.

With reference to FIG. 15, the power module 300 includes a relay 310, an AC input 314, an AC/DC converter 318, a battery charger 322, and a battery connector 326. The AC input 314 includes a connector or other mechanical and electrical coupling used to selectively connect the power module 300 to a commercial power source (e.g., 50 or 60 Hertz (Hz) AC at 120 V or 240 V). A connector is an electro-mechanical device for joining electrical circuits at an interface using a mechanical assembly. Connectors can include plugs (i.e., male-ended interfaces) and jacks (i.e., female-ended interfaces). The AC input 314 is configured to mate with a corresponding connector on a power cord or other electrical cable to receive AC power from an AC power source. The AC input 314 is electrically connected to a battery charger 322 used to recharge the battery pack 274, the AC/DC converter 318 used to convert AC power to DC power used to power the stand light 10, and the relay 310.

The battery connector 326 electrically connects the power module 300 with the battery pack 274, when the battery pack 274 is received within the recess 282 of the base housing 18. The battery connector 326 allows the battery pack 274 to be selectively electrically connected with the power module 300 via terminals. Thus, removing the battery pack 274 from the recess 282 of the base housing 18 disconnects the battery pack 274 with the battery charger 322. The battery charger 322 or the battery connector 326 may include additional mechanisms that allow the battery pack 274 to be held in place, restrained, or clamped to the power module 300 while the battery pack 274 is being charged, powering the area light, or in a standby state (e.g., not being charged or powering the area light).

The relay 310 provides a switching mechanism to toggle a power source between an AC power source (e.g., power received through the AC input 314) and a DC power source (e.g., power received through the battery connector 326). The relay 310 may be one of various types of relay (e.g., latching relay or solid-state relay) known in the art. The DC power, if present from the battery pack 274 or the AC/DC converter 318, passes through the relay to the light 10. An input for the relay 310 can be coupled to the AC power source via the AC input 314 and AC/DC converter 318 and the relay 310 senses when AC power is applied to the power module 310 via the relay input. The relay 310 toggles between an AC power source and a DC power source based on whether AC power is sensed by the relay 310. In addition, when AC power is not sensed by the relay 310, the AC input 314 or AC/DC converter 318 is electrically disconnected from the light 10 and the battery pack 274 is electrically coupled to the light 10 via a battery connector 326, where power for the light 10 may be provided by the battery pack 274. When AC power is sensed by the relay 310, the AC input 314 or AC/DC converter 318 is electrically coupled to the stand light 10 and the battery pack 274 is electrically disconnected from the stand light 10. When AC power is sensed by the relay 310, the relay 310 also couples the battery charger 322 to a battery connector 326, which can be used to charge the battery pack 274 coupled thereto.

In alternate embodiments, the relay 310 is between the AC input 314 and AC/DC converter 318 and selects between AC power from the AC input 314 and DC power from the battery connector 326.

The AC/DC converter 318 is coupled to the AC input 314 and the relay 310. The AC/DC converter 318 is a device that converts AC, which periodically reverses direction, to DC, which flows in only one direction. The AC/DC converter 318 converts a specified AC voltage (e.g., 120 Volts (V) AC) to a specified DC voltage (e.g., 12 V, 18 V, 24 V, or 28 V), which can be used by the light 10 and the battery charger 322. The AC/DC converter 318 is a discrete module with components separate from the battery charger 322. In alternate embodiments, the AC/DC converter 318 may be integrated with a battery charger 322.

Figure 16:
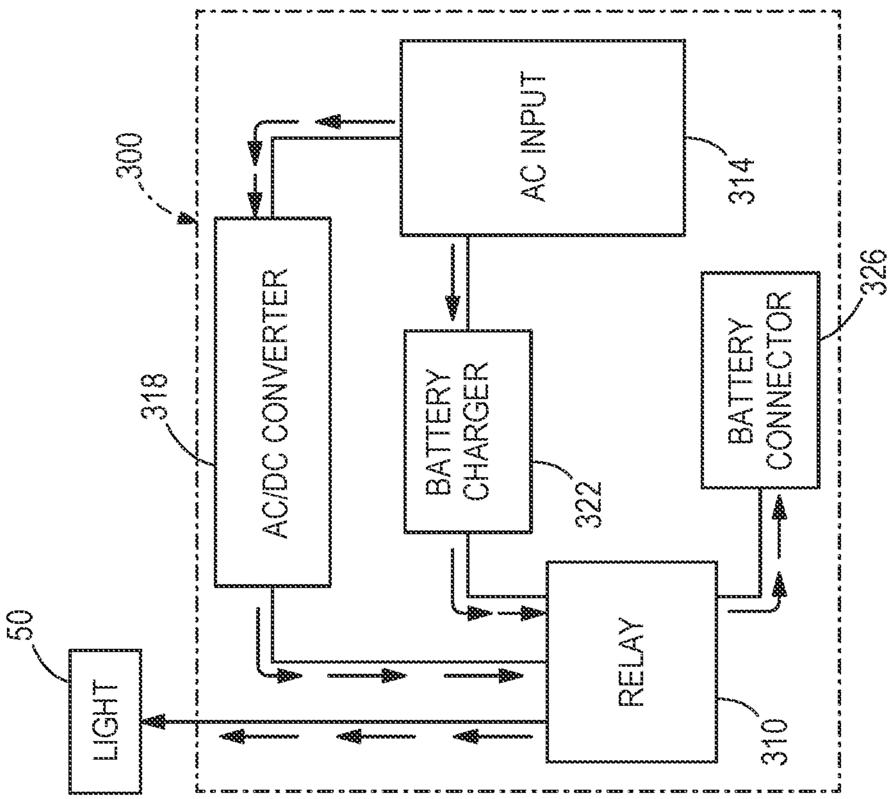
FIG. 16 is a schematic of the power module of FIG. 15, illustrating current flow when an AC input is connected to an AC source.
Figure 17:
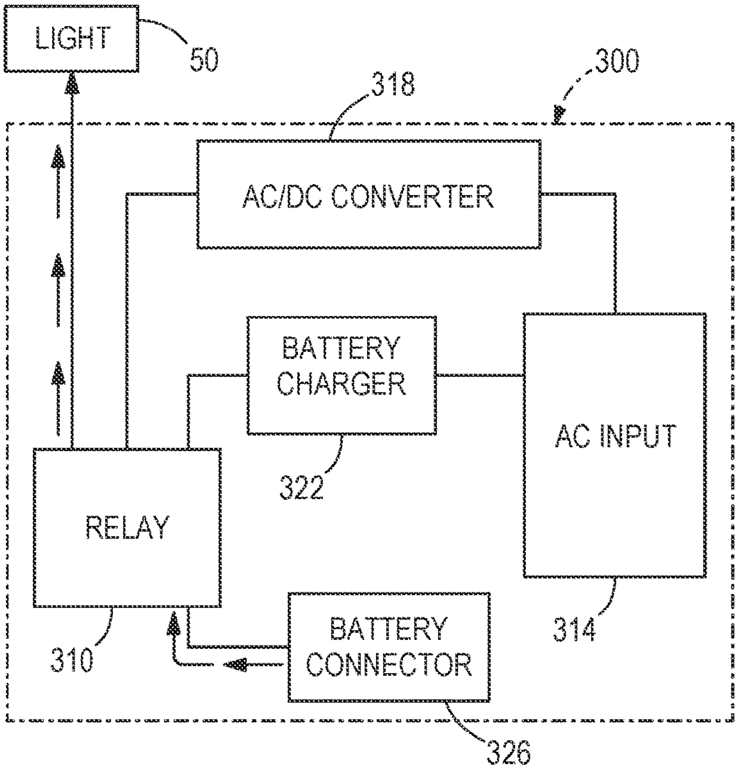
FIG. 17 is a schematic view of the power module of FIG. 15, illustrating current flow when a battery is connected to a battery connector.

The battery charger 322 is a device used to facilitate storing energy in the battery pack 274 by forcing an electric current through the battery pack 274. The battery charger 322 may include other control circuitry, such as circuitry to provide overcurrent and overcharge protection along with sensors to determine a level of charge in a battery pack (e.g., fully charged battery). As shown in FIG. 16, when the stand light 10 is powered using AC power, the battery charger 322 charges the battery pack 274 coupled to a battery connector 326. As shown in FIG. 17, when the light 10 is disconnected from AC power, the relay 310 disconnects the battery charger 322 from the battery pack 274, and electrically connects the battery connector 326 to the light 10 such that the battery pack 274 provides power to the stand light 10.

The battery pack 274 may be a power tool battery pack generally used to power a power tool, such as an electric drill, an electric saw, and the like (e.g., an 18 volt rechargeable battery pack, or an M18 REDLITHIUM battery pack sold by Milwaukee Electric Tool Corporation). The battery pack 274 may include lithium ion (Li-ion) cells. In alternate embodiments, the battery packs may be of a different chemistry (e.g., nickel-cadmium (NiCa or NiCad), nickel-hydride, and the like). In the illustrated embodiments, the battery pack is an 18 volt battery pack. In alternate embodiments, the capacity of the battery pack 274 may vary (e.g., the battery pack 274 may be a 4 volt battery pack, a 28 volt battery pack, a 40 volt battery pack, or battery pack of any other voltage).

The battery pack 274 may further include terminals (not shown) to connect to the battery connector 326 of the power module 300. The terminals for the battery pack 274 include a positive and a negative terminal to provide power to and from the battery pack 274. In some embodiments, the battery pack 274 further includes a temperature terminal to monitor the temperature of the battery pack, battery charger 322, or power module 300. In some embodiments, the battery pack 274 also includes data terminals to communicate with a portable device receiving power from the battery pack 274 or with the power module 300. For example, in alternate embodiments, the battery pack 274 may include a microcontroller that monitors characteristics of the battery pack 274. The microcontroller may monitor the state of charge of the battery pack 274, the temperature of the battery pack 274, or other characteristics relevant to the battery pack 274. The power module 300 may then be communicated with and regulated accordingly. In alternate embodiments, the microcontroller may also control aspects of charging and/or discharging of the battery pack 274. In some embodiments, the battery connector 326 may include the data terminals for communicating with the battery pack 274.

The battery connector 326 includes terminals positioned within the recess 282 of the base housing 18 to connect to the terminals of the battery pack 274. The latching mechanism 278 of the battery pack 274 may be used in combination with guide rails within the base housing 18 to selectively connect the battery pack 274 and the battery connector 326 together. The connector 326 includes a positive and a negative terminal for receiving and providing power to the battery pack 274. In alternate embodiments, the battery connector 326 includes a temperature terminal for measuring the temperature of one of the battery pack 274 and the battery connector 326.

With reference to FIG. 14, the battery pack 274 further includes an indicator 330 on the face of the battery pack 274 to display the current state of charge of the battery pack 274 and/or other characteristics of the battery pack 274. The indicator 330 includes a plurality of LEDs. As the state of charge of the battery pack 274 increases, more LEDs light up, and as the state of charge of the battery pack 274 decreases, the number of LEDs that are lit up decreases. In alternate embodiments, the battery pack 274 may include a different indicator to display the state of charge of the battery pack 274 (e.g., the indicator 330 may include a single LED that lights up only when the battery pack is fully charged). In alternate embodiments, the battery pack 274 does not include the indicator 330. As illustrated in FIG. 11, in some embodiments in which the battery connector 326 includes data terminals for communicating with the battery pack 274, the base housing 18 may include a battery display 334. The battery display 334 may receive the information from the power module 410, or a microcontroller, that monitors the battery 34 through the data terminals. The battery display 334 may include an indicator or indicators displaying the state of charge of the battery pack 274, similar to the indicator 330 of FIG. 14. In addition, the display may include a temperature indicator, to indicate the measured temperature of the battery pack 274, or whether or not the battery pack 274 is overheating. The battery display 334 may also include charging indicator lights 338 that light up a first color (e.g., red) when the battery pack 274 is charging, and light up a second color (e.g., green) when the battery pack 274 is fully charged.

As discussed above, the light head 50 includes a plurality of LEDs arranged in an array that provides a generally uniform illumination of a desired area. The head assembly housing 70 further includes a user interface 350 that may include functions or controls (e.g., at least one actuator) to control operation and functions on the stand light 10. As illustrated in FIG. 2, the actuator may include a power on/off function to toggle power to the light-emitting portion.

Figure 18:
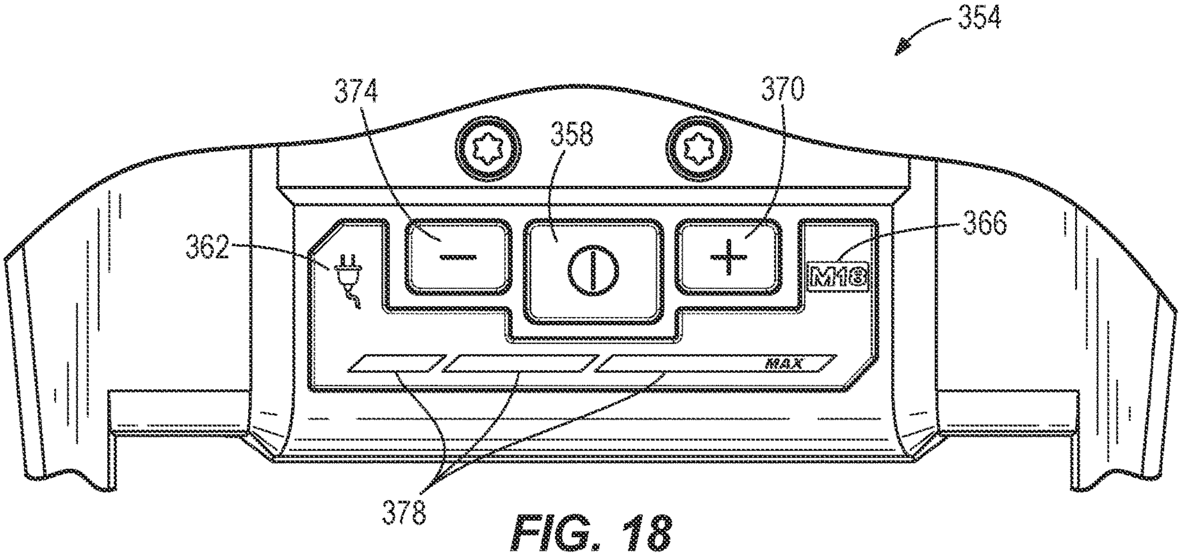
FIG. 18 is a top planar view of a user interface for use with the stand light of FIG. 1.

FIG. 18 illustrates an alternate embodiment of a user interface 354. Similar to the user interface 350 shown in FIG. 1, the alternate user interface 354 is supported on the elongate body 14 adjacent the first end 30. More particularly, the alternate user interface 354 is supported near the fixed handle 82 so that the interface 354 is visible and accessible regardless of the current position of the stand light 10 (e.g., collapsed or expanded). In other embodiments, the user interface 350 or 354 may be located elsewhere on the elongate body 14, the base housing 18, or the light head assembly 26.

The illustrated user interface 354 includes an actuator 358 (i.e., a power switch) operable to toggle power to the stand light 10. The user interface 354 further includes a first indicator 362, a second indicator 366, and a display light assembly that lights up the user interface 354. The display light assembly includes, for example, a plurality of LEDs to light up different portions of the user interface 354. The first indicator 362 corresponds to a first power input (i.e., the AC input 314), such that when the AC input 314 is connected to an AC power source the first indicator 362 is activated (i.e., the first indicator 362 is lit up by the display light assembly). In addition, the display light assembly may light up the user interface 354 with a first color (e.g., white) when the AC input 314 is connected to an AC power source. The second indicator 366 corresponds to a second power input (i.e., the battery connector 326, or DC input), such that when the battery connector 326 is connected to the battery 34 and the AC power source is disconnected with the AC input 314, the second indicator 366 is activated (i.e., the second indicator 366 is lit up by the display light assembly). In addition, the display light assembly may light up the user interface 354 with a second color different form the first color (e.g., red). In alternate embodiments, the user interface may light up as different colors, shapes, patterns, or other configurations to indicate to the user that one or the other of the first and second power inputs are connected or disconnected.

With continued reference to FIG. 18, the user interface 354 further includes various control functions, such as a mode actuator operable to change an intensity of the light. The mode actuator includes a high intensity actuator 370 to increase the light intensity by turning on more LEDs and/or increasing power to the currently illuminated LEDs. The mode actuator also includes a low intensity actuator 374 to decrease low intensity light by turning off some LEDs and/or decreasing power to the currently illuminated LEDs. The user interface 354 further includes a plurality of power level indicators 378. The number of power level indicators 378 lit corresponds to the intensity of the light, such that pressing the high intensity actuator 370 increases the number of power level indicators 378 lit by one, and pressing the low intensity actuator 374 decreases the number of power level indicators 378 lit by one (as well as increasing and decreasing the light intensity, respectively). In some embodiments, the maximum intensity of the light is indicated when all of the power level indicators 378 are lit. Similarly, the minimum intensity of the light is indicated when only one of the power level indicators 378 is lit.

The power level indicators 378 change configurations depending on which power input 314, 326 is being used to power the stand light 10. In the illustrated embodiment, the power level indicators 378 light up in different colors (e.g., white, red, etc.), depending on which power input 314, 326 powering the stand light 10. In other embodiments, the power level indicators 378 may additionally or alternatively change their pattern, shape, and/or size to indicate to a user to power input 314, 326 powering the stand light 10.

The user interface 354 may be connected to a microprocessor, controller, switch, relay, or other control circuitry to provide the functions described. In some embodiments, the user interface may also include an indicator, similar to the indicator 330 of the battery pack 274 (FIG. 14), to display the state of charge of the battery pack 274.

In some embodiments, the light 10 may further include a radio (e.g., using radio frequencies) or optical transceiver (e.g., infra-red transceiver) configured to communicate with a wireless device, such as a smartphone, a tablet computer, a laptop computer, or handheld device. The radio or optical transceiver provide one-way or duplex communication with the wireless device and interface with the user interface 350, 354 of the area light to control the control functions via the wireless device.

Figure 19:
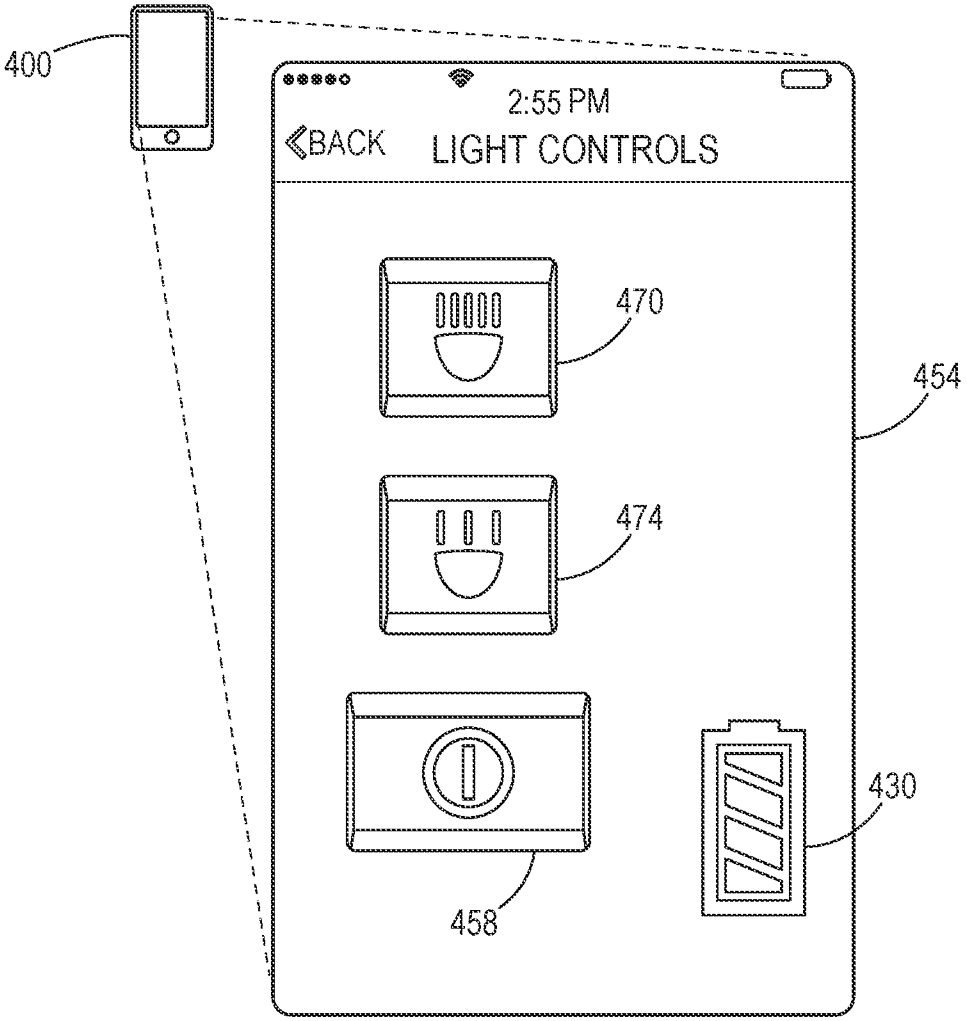
FIG. 19 is a perspective view of a light control display on a wireless device for the stand light of FIG. 1.

FIG. 19 illustrates a wireless device 410 (e.g., user equipment) that includes a microcontroller and radio or optical transceiver that use a wireless protocol, such as Bluetooth, WiFi, Institute of Electrical and Electronics Engineers (IEEE) 802.11 Standard (Std), WiMax, IEEE 802.16 Std, or 3rd Generation Partnership Project (3GPP) Long Term Evolution (LTE) standard to communicate with the radio on the light 10. The wireless device may include an application or software that has a user interface 454 similar to the user interface 354 to control the light 10 wirelessly. The user interface 454 of the application on the wireless device may include an indicator 430, similar to the indicator 330 of the battery pack 274, to display the state of charge of the battery pack 274. The user interface 454 of the application may also include similar control functions (e.g., a power on/off function 458, a high intensity actuator 470, or a low intensity actuator 474) as provided by the user interface 354 of the light 10. In some embodiments, the user interface 454 may include first and second indicators similar to the first and second indicators 362, 366 of the user interface 366, that light up according to which of the first and second power inputs 314, 326 is connected. In addition, in some embodiments, the user interface 454 may include a plurality of power level indicators similar to those described above. The application or software may be downloaded or copied to the wireless device.

Referring back to FIGS. 1 and 2, during use to deploy the stand light 10 into the operating position (from the collapsed position), a user grasps the fixed handle 82 with a first hand and the handle 138 with a second hand. The user then depresses the actuator 194 downwardly with his/her thumb of the second hand to disengage the locking member 58 with the first locking recess 226. Once disengaged, the user slides the handle 138 away from the fixed handle 82 along elongate body 14 (i.e., downwardly) to cause the legs 142 to pivot outwardly into the operating position as shown in FIG. 2. More specifically, the user depresses the actuator 194 downwardly against the first spring 198 causing the locking pin 206 to withdraw from the first locking recess 226 against the second spring 202 as the pin 218 follows the cam surface 214 (FIG. 12). The third spring 230 then biases the handle 138 toward the second end 34 of the elongate body, until the retaining surface 246 of the axially extending member 248 of the handle 138 contacts the second surface 258 of the radially protruding member 234 of the collar 134. The user then slides the handle 138 and the collar 134 downwardly toward the second end 34 of the body 14. As the first end 146 of the legs 142 approaches the second end 34 of the body 14, the second end 150 of the legs 142 is pivoted outwardly about the hinged end 146 by the leg links 158. As the handle 138 reaches the second end 34 of the body 14, the locking pin 206 is biased into engagement with the second locking recess to secure the support assembly 22 in the operating position. In the operating position, the stand light 10 may be supported on ground or an operating surface such that the axis A of the body 14 is generally vertical (i.e., perpendicular to the ground or the operating surface).

To return the stand light 10 to the collapsed or storage position to transport or store the stand light 10, a user grasps the fixed handle 82 with his/her first hand and the handle 138 with his/her second hand. The user then depresses the actuator 194 downwardly with his/her thumb of the second hand to disengage the locking member 58 with the second locking recess. The handle 138 is then slid towards the first end 30 of the elongate body (i.e., upwardly towards the fixed handle 82) to cause the legs 142 to pivot inwardly into the collapsed position as shown in FIG. 1. More specifically, a user depresses the actuator 194 downwardly to cause the locking member 58 to withdraw from the second locking recess, like described above with respect to the first locking recess 226. The user then slides the handle 138 upwardly toward the first end 30 of the body 14. As the collar 134 moves upward, the legs 142 pivot inward about the first end 146 of the legs 142 and the leg links 158 fold inwardly. Once the handle 138 and the collar 134 are adjacent the first end 30 of the body 14 and cannot slide further, the handle 138 is further pushed upwards relative to the collar 134 such that third spring 230 is compressed until the locking pin 206 is biased into engagement with the first locking recess 226 to secure the support assembly 22 in the collapsed position and the legs 142 tightly against the elongate body 14.

As shown in FIG. 13, when the support assembly 22 is in the collapsed position and the locking assembly 190 is in the locked position, the third spring 230 acts upwardly on the first surface of the annular member 80 of the collar 134 to urge the collar 134 upwardly towards the first end 30 of the body 14. As the collar 134 is urged upwardly, the legs 142 are pivoted inwardly and held tight against the body 14, minimizing any relative movement between the legs 142 and the body 14 (i.e., slack between the legs 142 and the body 14). In addition, the third spring 230 acts downwardly on the handle 138 to provide tension to reduce tolerance and misalignment of the locking pin 206 within the locking recesses 226.

When in the operating position, the head assembly 26 may be extended from the head assembly housing 70 by moving the clamping assembly 46 to the unclamped position, thus allowing for adjustment in height of the head assembly 26 via the extension poles 38, 42. Once the clamping assembly 46 is in the unclamped position, the user may lift the head assembly 26 out of the opening 74 in the head assembly housing 70 to adjust the height of the head assembly 26. While the clamping assembly 46 is unclamped to shorten the height of the head assembly 26, the user pushes down on the head assembly 26 to collapse extension poles 38, 42. In this way, the body 14 may be extended or retracted between a first position (FIG. 2) having a first, minimum height between about 30 inches and about 60 inches (e.g., at least about 45 inches) and a second position having a second, maximum height between about 80 inches and about 105 inches (e.g., at least about 92 inches). The difference in the first and second heights is an adjustable height of the stand light, the adjustable height being between about 20 inches and 75 inches (e.g., at least about 40 inches). The head assembly 26 may be adjusted to any height within the range of the adjustable height via the extension poles 38, 42. When in the unclamped position, manual force is used to move the extension poles 38, 42 between the retracted position (FIG. 2) and the extended position (FIG. 3). The clamping assembly 46 is then moved to a clamped position, where the clamping assembly 46 selectively tensions the extension poles 38, 42 of the telescoping body 14 to inhibit the extension poles 38, 42 to slide relative to one another. As previously mentioned, while the extension poles 38, 42 are extended and the clamping assembly 46 is in the unclamped position, the wipers 86 impede movement of the extension poles 38, 42 from the extended position (FIG. 3) to the retracted position (FIG. 2) under the weight of the head assembly 26.

To control power to the stand light 10 and the light head 50, a user actuates the power button 358 on the user interface 354, pressing the power button 358 to turn power on/off. To increase the light intensity of the light head 50 by a predetermined increment, the user actuates the high intensity actuator 370. While performing this action, the number of power level indicators 378 that are lit increases by one to quickly indicate to the user the intensity of the light head 50. To decrease the light intensity of the light head 50 by a predetermined increment, the user actuates the low intensity actuator 374. While performing this action, the number of power level indicators 378 that are lit decreases by one.

With reference to FIG. 16, when an AC power source is connected to the power module 300 via the AC input 314 and the battery pack 274 is connected to the power module 300 via the battery connector 326, AC current passes through the AC/DC converter 318 and the relay 310 to power the light 10, and also passes through the battery charger 322 and the relay 310 to the battery connector 326 to charge the battery pack 274. When the AC input is connected a signal is sent to the user interface 354 to activate the first indicator 362, and, additionally or alternatively, the display light assembly is lit a first color (e.g., white). Disconnecting the AC power source with the AC input 314 signals the relay 310 for toggling to the battery pack 274 for powering the light 10, as shown in FIG. 17. In addition, when the DC input is the only power source connected to the power module 300, a signal is sent to the user interface 354 to activate the second indicator 366, and, additionally or alternatively, the display light assembly is lit a second color (e.g., red). Alternatively, disconnecting the battery pack 274 from the battery connector 326 causes the AC current to only flow from the AC input 314 through the AC/DC converter 318 to power the light 10.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. A portable light comprising:

an elongate body having a first end, a second end opposite the first end, and a longitudinal axis extending through the first and second ends;

extension poles telescopically coupled to the first end of the elongate body;

a clamping assembly coupled to at least one of the extension poles, the clamping assembly being movable between a clamped position and an unclamped position to allow relative axial movement between the at least one of the extension poles and the elongate body;

a base housing coupled to the second end of the elongate body;

a head assembly pivotably coupled to one of the extension poles via a first hinge between the head assembly and the one of the plurality of extension poles, the head assembly including a plurality of light heads;

each of the plurality of light heads pivotably coupled to the head assembly via a respective second hinge on the head assembly;

a locking assembly including an actuator and a locking member coupled for movement with the actuator;

a plurality of legs pivotably coupled to the elongate body; and a first locking recess disposed adjacent the first end of the elongate body and a second locking recess disposed adjacent the second end of the elongate body, wherein the locking member is alternately receivable in the first locking recess and the second locking recess to inhibit movement of the plurality of legs relative to the elongate body, and wherein the locking member is removable from the first locking recess and the second locking recess to enable movement of the plurality of legs relative to the elongate body, wherein each of the plurality of legs is pivotably coupled to the elongate body, the plurality of legs being movable between a first position, in which the plurality of legs is collapsed against the elongate body and the locking member is received within the first locking recess, and a second position, in which the plurality of legs is obliquely angled relative to the elongate body and the locking member is received within the second locking recess, wherein the plurality of light heads is configured to alternately face simultaneously in a first direction, in which the plurality of light heads emits light in a direction parallel with the longitudinal axis, and face simultaneously in a second direction opposite of the first direction.

2. The portable light of claim 1, wherein the light head is one of three light heads, wherein each of the three light heads is pivotably coupled to the head assembly via a respective second hinge, and wherein the respective second hinge in each case includes a pair of hinge lobes.

3. The portable light of claim 1, wherein each of the plurality of light heads is independently pivotable about the respective second hinge.

4. A portable light comprising:

an elongate body having a first end, a second end opposite the first end, and a longitudinal axis extending through the first and second ends;

a plurality of extension poles slidably received in the elongate body and being coaxial with the elongate body, the plurality of extension poles being movable out of the first end of the elongate body between an extended position and a retracted position;

a light head pivotably coupled to an end of one of the plurality of extension poles;

a base housing positioned at the second end of the elongate body;

a stationary handle fixed to the first end of the elongate body, the stationary handle defining a grip axis that is perpendicular to and offset from the longitudinal axis of the elongate body;

a movable handle that is movable between a first position and a second position along the longitudinal axis of the elongate body, the movable handle defining a grip axis that is parallel to and offset from the longitudinal axis of the elongate body;

a plurality of legs, the plurality of legs being collapsed along the elongate body when the movable handle is in the first position and being expanded apart from the elongate body when the movable handle is in the second position; and a plurality of leg links, each leg link having a first end hingedly coupled within the base housing and a second end coupled to one of the plurality of legs, the plurality of leg links being collapsed along the elongate body when the movable handle is in the first position and being expanded apart from the elongate body when the movable handle is in the second position, wherein each leg link includes a pair of parallel members connected together by an offset portion extending away from the pair of parallel members, and wherein the offset portion of each leg link is received and hingedly coupled within the base housing such that, when the movable handle is in the second position and the plurality of leg links is expanded apart from the elongate body, the offset portion extends away from the pair of parallel members in a direction generally parallel with the longitudinal axis of the elongate body.

5. The portable light of claim 4, wherein each leg link includes a pair of parallel members connected together at a connection, and wherein each leg link extends into the base housing to position the respective connection entirely within the base housing.

* * * * *